United States Patent
Kokaji et al.

(10) Patent No.: US 9,375,905 B2
(45) Date of Patent: Jun. 28, 2016

(54) BONDED MEMBER MANUFACTURING APPARATUS AND METHOD OF MANUFACTURING BONDED MEMBER

(71) Applicant: ORIGIN ELECTRIC COMPANY, LIMITED, Tokyo (JP)

(72) Inventors: Hideyuki Kokaji, Tokyo (JP); Koji Yamaguchi, Tokyo (JP)

(73) Assignee: ORIGIN ELECTRIC COMPANY, LIMITED, Tokyo (JP)

( * ) Notice: Subject to any disclaimer, the term of this patent is extended or adjusted under 35 U.S.C. 154(b) by 118 days.

(21) Appl. No.: 13/631,837

(22) Filed: Sep. 28, 2012

(65) Prior Publication Data

US 2013/0081751 A1 Apr. 4, 2013

(30) Foreign Application Priority Data

Sep. 30, 2011 (JP) ................................. 2011-218643

(51) Int. Cl.
*B32B 37/00* (2006.01)
*B32B 37/02* (2006.01)

(52) U.S. Cl.
CPC ............. *B32B 37/0046* (2013.01); *B32B 37/02* (2013.01); *B32B 2310/0831* (2013.01); *B32B 2457/202* (2013.01); *Y10T 156/1798* (2015.01)

(58) Field of Classification Search
CPC ........................... B32B 37/0046; B32B 37/02
USPC .................... 156/379.6, 380.9, 360
See application file for complete search history.

(56) References Cited

U.S. PATENT DOCUMENTS

| | | | | | |
|---|---|---|---|---|---|
| 5,854,664 | A | * | 12/1998 | Inoue et al. | 349/92 |
| 6,004,413 | A | * | 12/1999 | Couttenier | 156/99 |
| 6,066,218 | A | * | 5/2000 | Kuhn et al. | 156/87 |
| 2003/0159769 | A1 | * | 8/2003 | Ogimoto et al. | 156/64 |
| 2004/0031362 | A1 | * | 2/2004 | Mizuta | 83/13 |
| 2004/0177930 | A1 | * | 9/2004 | Chu | 156/538 |
| 2006/0153054 | A1 | * | 7/2006 | Kobayashi et al. | 369/275.1 |
| 2006/0164961 | A1 | * | 7/2006 | Vromas | 369/275.1 |

FOREIGN PATENT DOCUMENTS

| | | |
|---|---|---|
| CN | 1656548 A | 8/2005 |
| JP | 2011-022508 | 2/2011 |
| JP | 2011-067802 | 4/2011 |

OTHER PUBLICATIONS

Office Action of the Chinese Patent Application, mailed Mar. 17, 2015, 3 pgs., without English translation.

* cited by examiner

*Primary Examiner* — Daniel McNally
(74) *Attorney, Agent, or Firm* — Squire Patton Boggs (US) LLP

(57) ABSTRACT

To prevent misalignment between substrates and distortion of surface, and to keep film thickness uniformity of thin substrate when two substrates are bonded for bonded member, bonded member manufacturing apparatus of bonding first substrate and second substrate, comprising resin film forming means for forming liquid state resin film on the first substrate, semi-curing means for maintaining outer peripheral section of resin film in uncured state and curing inner section surrounded with outer peripheral section in semi-cured state, and substrate bonding means for bonding first substrate and second substrate by bringing second substrate into contact with resin film, such that one end of outer peripheral section is determined as starting point of contact so that boundary line between contact portion and noncontact portion moves in one direction from starting point to opposite end of outer peripheral section while applying pressing force to second substrate.

11 Claims, 18 Drawing Sheets

FIG. 1

10 MANUFACTURING APPARATUS OF BONDED MEMBER

- 20 RESIN FILM FORMING MEANS
  - 21 MOUNTING MEANS (TABLE)
  - 22 APPLICATION MEANS (SLIT COATER)
  - 23 SCANNING MEANS

- 30 SEMI-CURING MEANS
  - 31 ULTRAVIOLET LIGHT IRRADIATION MEANS
  - 32 LIGHT BLOCKING MEANS

- 40 SUBSTRATE BONDING MEANS
  - 41 (41B1, 41B2) HOLDING MEANS
  - 42 ROLLER MEANS

- 50 CONTROLLER

OBJECT FOR BONDING
- 11 FIRST SUBSTRATE (LIQUID CRYSTAL PANEL, ETC.)
- 12 SECOND SUBSTRATE (SUBSTRATE FILM)

BONDING AGENT
- 13 RESIN FILM
  - 14 OUTER PERIPHERAL SECTION
  - 15 INNER SECTION
  - 16 STARTING POINT

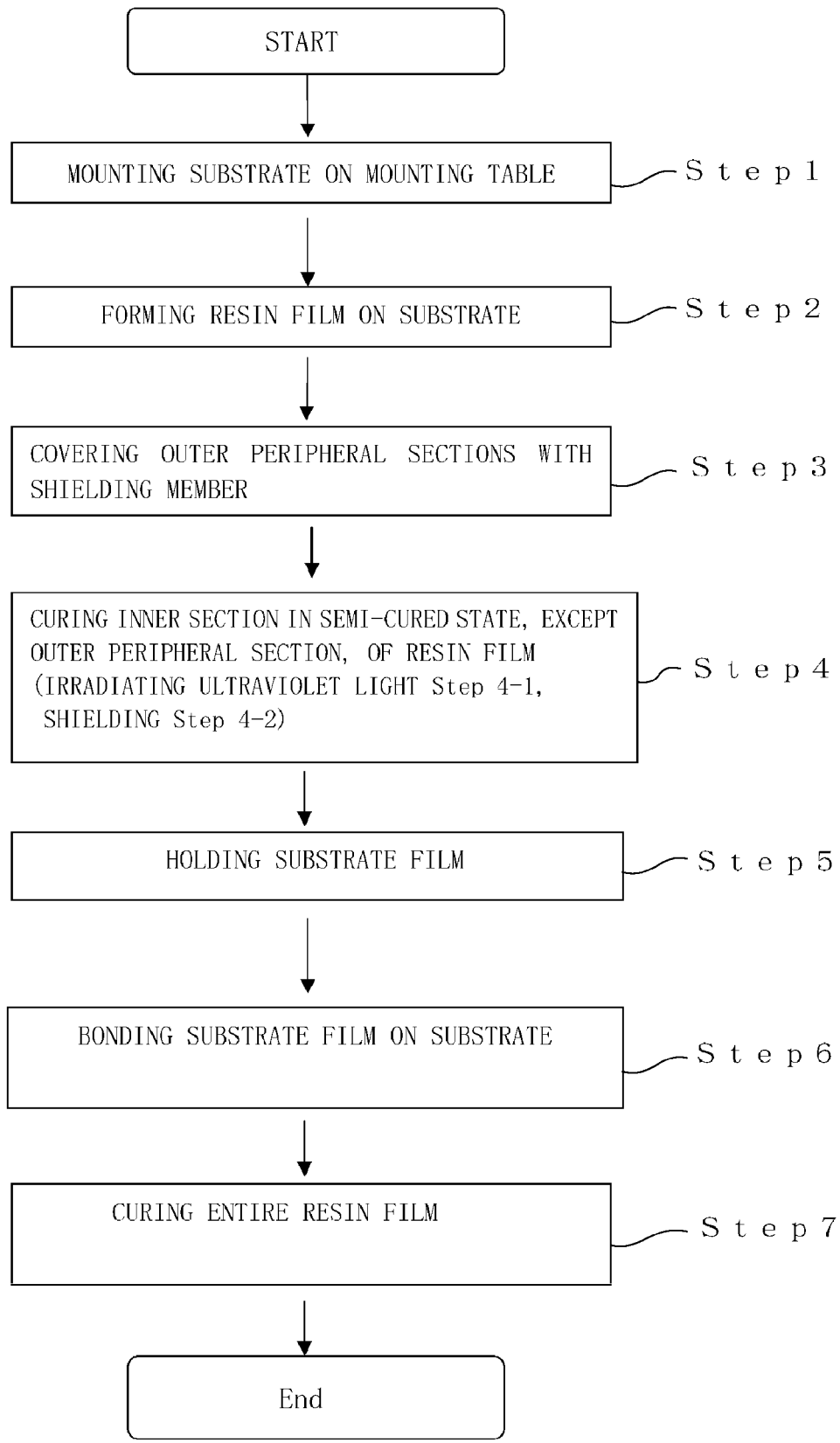

FIG. 8

10A MANUFACTURING APPARATUS OF BONDED MEMBER

- 20 RESIN FILM FORMING MEANS
  - 21 MOUNTING MEANS (TABLE)
  - 22 APPLICATION MEANS (SLIT COATER)
  - 23 SCANNING MEANS

- 30 SEMI-CURING MEANS
  - 31 ULTRAVIOLET LIGHT IRRADIATION MEANS
  - 32 LIGHT BLOCKING MEANS

- 40A SUBSTRATE BONDING MEANS
  - 41 HOLDING MEANS
  - 43 ROTATING MEANS
    - 43A HINGE PART
    - 43B ROTATIONAL SHAFT
    - 43C DRIVING PART
  - 44 ROTATIONAL SHAFT POSITION ADJUSTING MEANS

- 50 CONTROLLER

OBJECT FOR BONDING
- 11 FIRST SUBSTRATE (LIQUID CRYSTAL PANEL, ETC.)
- 12 SECOND SUBSTRATE (SUBSTRATE FILM)

BONDING AGENT
- 13 RESIN FILM
  - 14 OUTER PERIPHERAL SECTION
  - 15 INNER SECTION
  - 16 STARTING POINT

FIG. 9
(a) 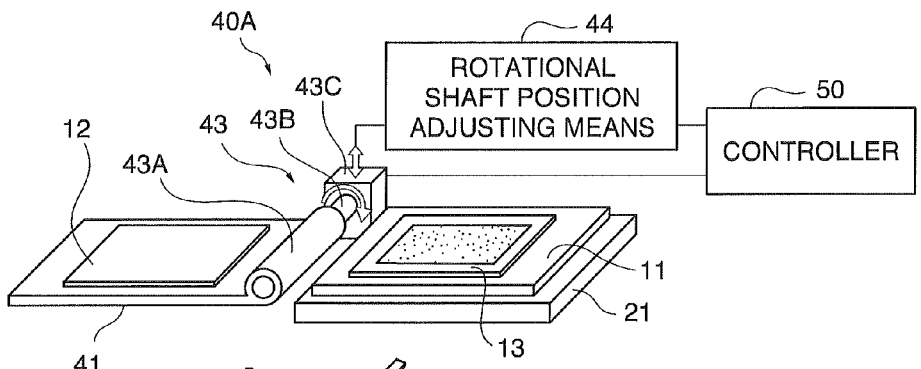
(b) 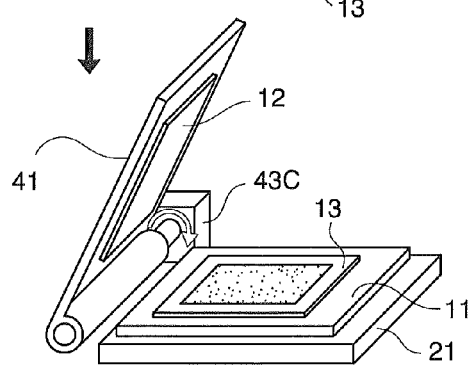
(c) 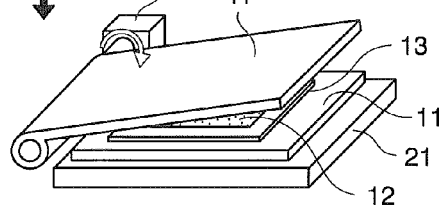
(d) 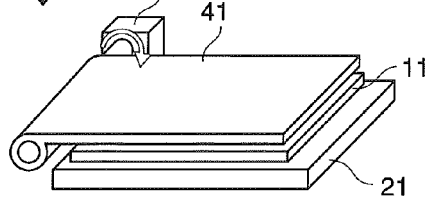
(e) 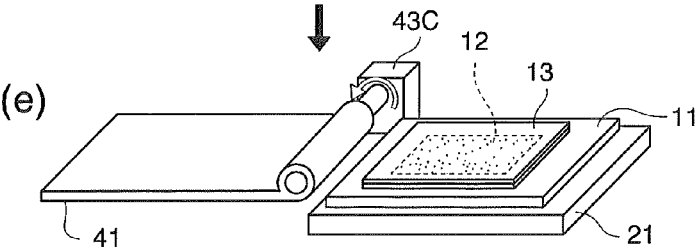

*FIG. 12*

- 10B MANUFACTURING APPARATUS OF BONDED MEMBER
  - 20 RESIN FILM FORMING MEANS
    - 21 MOUNTING MEANS (TABLE)
    - 22 APPLICATION MEANS (SLIT COATER)
    - 23 SCANNING MEANS
  - 30 SEMI-CURING MEANS
    - 31 ULTRAVIOLET LIGHT IRRADIATION MEANS
    - 32 LIGHT BLOCKING MEANS
  - 40B SUBSTRATE BONDING MEANS
    - 41 HOLDING MEANS
    - 43 ROTATING MEANS
      - 43A HINGE PART
      - 43B ROTATIONAL SHAFT
      - 43C DRIVING PART
    - 44 ROTATIONAL SHAFT POSITION ADJUSTING MEANS
  - 50 CONTROLLER
  - 60 DIRECT-CURRENT POWER SUPPLY

OBJECT FOR BONDING
- 11 FIRST SUBSTRATE (LIQUID CRYSTAL PANEL, ETC.)
- 12 SECOND SUBSTRATE (SUBSTRATE FILM)

BONDING AGENT
- 13 RESIN FILM
  - 14 OUTER PERIPHERAL SECTION
  - 15 INNER SECTION
  - 16 STARTING POINT

FIG. 16

- 10D MANUFACTURING APPARATUS OF BONDED MEMBER
  - 20 RESIN FILM FORMING MEANS
    - 21 MOUNTING MEANS (TABLE)
    - 22 APPLICATION MEANS (SLIT COATER)
    - 23 SCANNING MEANS
  - 30 SEMI-CURING MEANS
    - 31 ULTRAVIOLET LIGHT IRRADIATION MEANS
    - 32 LIGHT BLOCKING MEANS
  - 40D SUBSTRATE BONDING MEANS
    - 41 HOLDING MEANS
    - 43 ROTATING MEANS
      - 43A HINGE PART
      - 43B ROTATIONAL SHAFT
      - 43C DRIVING PART
    - 44 ROTATIONAL SHAFT POSITION ADJUSTING MEANS
  - 50 CONTROLLER
  - 70 SUBSTRATE THICKNESS MEASURING MEANS

OBJECT FOR BONDING
- 11 FIRST SUBSTRATE (LIQUID CRYSTAL PANEL, ETC.)
- 12 SECOND SUBSTRATE (SUBSTRATE FILM)

BONDING AGENT
- 13 RESIN FILM
  - 14 OUTER PERIPHERAL SECTION
  - 15 INNER SECTION
  - 16 STARTING POINT

US 9,375,905 B2

BONDED MEMBER MANUFACTURING APPARATUS AND METHOD OF MANUFACTURING BONDED MEMBER

CROSS REFERENCE TO RELATED APPLICATION

This application claims the benefit of Japanese Patent Application No. 2011-218643 filed on Sep. 30, 2011, which is hereby incorporated by reference in its entirety.

BACKGROUND OF THE INVENTION

1. Technical Field

The present invention relates to a manufacturing apparatus of a bonded member and a manufacturing method of a bonded member. More particularly, the present invention relates to a manufacturing apparatus of a bonded member and a manufacturing method of a bonded member for bonding two substrates as the bonded members together adjusting a curing state of a resin film.

2. Related Art

Conventionally, when manufacturing the bonded member, particularly an optical device with the substrate in non-circular shape such as a liquid crystal panel, resin has been applied in a so-called fishbone shape, and the substrates have been bonded together. In other words, bonding has been conducted by applying the resin that becomes a major section around a center of one substrate, applying the resin as plural guidance sections branching from the major section toward the outer periphery of the substrate, placing the one substrate to face to the other substrate, and gradually moving the substrates close to each other to spread the applied resin over the entire substrate. (See Patent Documents 1 and 2)

FIG. 18 schematically shows a conventional bonding method. In bonding of comparatively thick substrates 11E and 12E, when the substrates are provisionally bonded by irradiating ultraviolet light from cutout sections 17E at four corners of the holding means 41E with an ultraviolet irradiation means 31E in a state where one substrate 12E is held with a holding means 41E, the initial state of two combined substrates 11E and 12E could be maintained even if the held state is cancelled after bonding.

[Patent Document 1]

Japanese Patent Application Publication No. 2011-22508

[Patent Document 2]

Japanese Patent Application Publication No. 2011-67802

However, if at least one of the two substrates is thin, it has been difficult to maintain uniform film thickness after bonding. For example, due to the shape of a holding surface or the presence of absorption holes of the holding means, distortion occurs on a surface of the film-like substrate, and the uniformity of the film thickness is largely affected.

The following problems arise when the film-like thin substrate is provisionally bonded by the irradiation of the ultraviolet light from the cutout sections 17E at four corners of the holding means 41E with the ultraviolet irradiation means 31E in a state where the film-like thin substrate is held in the holding means 41E by the conventional holding means. In other words, the light incident from a space between an end of the holding means 41E and the substrate 11E into the inside of the substrate is dispersed between the holding means 41E and the substrate 11E, or the area where the ultraviolet light is blocked and the area where the ultraviolet light is irradiated are produced, and therefore the differences in amount of irradiation of the ultraviolet light arise, and nonuniform curing occurs on a resin film 13E. Thus, there has been a problem that the distortion (undulation) occurs on the surface of the film-like substrate and the uniform film thickness cannot be maintained.

In a curing process of the resin film after bonding, if the holding means 41E holding the film-like substrate could be removed and the film-like substrate could be cured without being held, the holding member 41E might not be an obstacle, and the resin film 13E could be uniformly cured. However, there has been a problem that when the holding member 41E is removed from the film-like substrate, the film-like substrate combined at an optimum position on the substrate 11E becomes misaligned.

In addition, when a relative misalignment is present between the substrates, or when the distortion (undulation) occurs on the surface of the film-like substrate and the film thickness becomes nonuniform, it results in significant reduction of visibility and in disfigurement. Furthermore, in a case where a touch panel as the film-like substrate is bonded to the substrate, the sensitivity of a touch sensor becomes nonuniform.

The object of the present invention is to prevent the relative misalignment from occurring between the substrates, to prevent the distortion (undulation) from occurring on the surface of the thin substrate, and to achieve the uniformity in the film thickness in a case where one of the substrates is a thin substrate when two substrates are bonded together to produce the bonded member.

SUMMARY OF THE INVENTION

To achieve the above object, a bonded member manufacturing apparatus 10 according to Aspect (1) of the present invention is, as shown in FIG. 1 for example (see FIG. 3 for each component), a bonded member manufacturing apparatus 10 for bonding a first substrate 11 and a second substrate 12 together, comprising: a resin film forming means 20 for forming a liquid state resin film 13 on the first substrate 11; a semi-curing means 30 for maintaining an outer peripheral section 14 of the resin film 13 formed with the resin film forming means 20 in an uncured state and curing an inner section 15 surrounded with the outer peripheral section 14 in a semi-cured state; and a substrate bonding means 40 for bonding the first substrate 11 and the second substrate 12 together by bringing the second substrate 12 into contact with the resin film 13 wherein the outer peripheral section 14 is in the uncured state and the inner section 15 is in the semi-cured state, such that one end of the outer peripheral section 14 is determined as a starting point 16 of the contact so that a boundary line between a contact portion and a noncontact portion moves in one direction from the starting point 16 to an opposite end of the outer peripheral section while applying pressing force to the second substrate, the contact portion being already contacted and the noncontact portion being not yet contacted in a process of bringing the second substrate 12 into contact with the resin film.

Herein, the bonded member means a product in which two or more members are bonded together with a bonding agent (adhesive). Therefore, the bonded member manufacturing apparatus means an apparatus that bonds two or more members by using the bonding agent. In this specification, a case of bonding the first substrate 11 and the second substrate 12 is handled. Although any substrates can be selected as the first substrate 11 and the second substrate 12, an example in which the first substrate 11 is a substrate for an optical device such as a liquid crystal panel and the second substrate 12 is a transparent thin substrate such as a protective film is handled as a typical example. Although the shape of the substrate is generally like a rectangular flat plate, the shape is not limited to the rectangular shape but can be any shapes such as a circular shape and a heart shape, and not limited to the flat plate but may be slightly curved or concave or convex, or may have depressions, and changes in thickness, and the substrate may be constructed with a flexible material. The outer peripheral section 14 of the resin film 13 means a region in a specified width from an outer periphery when the resin film 13 applied on the first substrate 11 is viewed from the normal direction of the first substrate 11. Although the specified width can be determined appropriately, herein, because a bulged portion in comparison with the other portion is formed in the outer periphery at the time of application of the resin in the liquid state, the width may approximately be agreed with such the width that the bulged portion is formed or slightly larger than the width (for example, as large as or twice as large as the width). The inner section 15 means the area surrounded with the outer peripheral section 14 of the resin film 13 that is applied on the first substrate.

Regarding the cured (hardened) state of the resin film 13, the state where the film has sufficient hardness as a product is referred to as a fully cured state, and the semi-cured state means the state where cure degree is lower than that in the fully cured state and adhesiveness to the second substrate 12 remains. The semi-cured state also means the state where the modulus of elasticity (stress/distortion) is lower than that in the fully cured state. The uncured state means the state where cure treatment (ultraviolet irradiation) is not conducted or the state where, even if the cure treatment is conducted, it is not sufficient and the liquid state is maintained, that is, the state where the flowability is maintained.

According to the configuration of the present aspect, even if one of the substrates is a thin substrate when two substrates are bonded together to produce the bonded member, the manufacturing apparatus 10 of the bonded member can be provided such that (1) since the inner section 15 of the resin film 13 is semi-cured, thereby the viscosity of the resin increases, and because one substrate is provisionally bonded to the other substrate when one substrate is bonded to the other substrate, the relative misalignment can be prevented from occurring between the substrates, (2) a distortion (undulation) can be prevented from occurring on a surface of the thin substrate, and the uniformity in the film thickness can be achieved.

The bonded member manufacturing apparatus 10 according to Aspect (2) is a manufacturing apparatus of Aspect (1), as shown in FIG. 1 and FIG. 3 for example, wherein the semi-curing means 30 has an ultraviolet irradiation means 31 for irradiating ultraviolet light to cure the resin film 13, and a light blocking means 32 for blocking the ultraviolet light by the ultraviolet irradiation means 31 to be irradiated to the outer peripheral section 14 of the resin film 13 formed with the resin film forming means 20.

The light blocking means 32 is preferably a shielding means that shields the outer peripheral section 14 from the irradiation of the ultraviolet light by the ultraviolet irradiation means 31.

According to the configuration of this Aspect, by irradiating the ultraviolet light using the light blocking means 32, the resin film 13 formed on the first substrate 11 can be reliably maintained with the outer peripheral section 14 in the uncured state and with the inner section 15 cured in semi-cured state. In addition, for example, by controlling the time of the ultraviolet irradiation or the intensity of the ultraviolet light, the semi-cured state can be properly adjusted.

The bonded member manufacturing apparatus 10 according to Aspect (3) is a manufacturing apparatus of Aspect (1) or Aspect (2), as shown in FIG. 5 for example, wherein the second substrate 12 is a transparent polymer film; and the substrate bonding means 40 has a mounting means 21 for mounting the first substrate 11 thereon and a roller means 42 for rolling on the second substrate 12 from one end side to another end side of the outer peripheral section 14 while pressing the second substrate 12 toward the first substrate 11, and thereby bonding the second substrate 12 to the first substrate 11.

Herein, the polymer film as the second substrate 12 is required to have transparency, and various characteristics are required, depending on the optical device that constructs the first substrate 11. The polymer film has, in addition to a transparency, a protective function that protects the surface of the liquid crystal panel from contamination in a case where the first substrate 11 is an optical device such as the liquid crystal panel. Besides, a polycarbonate (PC) film to be used for optical compensation is preferable in a case of use in a mobile phone, and a cycloolefin (COP) film is preferable in a case of use in a touch panel. In this specification, a distinction is made between the mounting means 21 that the first substrate 11 is mounted on and a holding means 41 (see Aspect 4) that holds the second substrate 12, but the mounting means 21 may also have a vacuum suction hole or a claw for holding, and the holding means 41 may merely mounts the substrate thereon.

According to the configuration of this Aspect, when the second substrate 12 is bonded to the resin film 13 applied on the first substrate 11, the roller means 42 is used to the resin film 13 in which the inner section 15 is cured in the semi-cured state, and therefore the relative misalignment can be prevented from occurring between the substrates, the distortion (undulation) can be prevented from occurring on the surface of the thin substrate and the smoothness can be maintained. The uniformity in the film thickness can also be achieved. In addition, there is an advantage that air bubbles are hardly trapped between the second substrate 12 and the resin film 13.

The manufacturing apparatus 10A according to Aspect (4) is a manufacturing apparatus of Aspect (1) or Aspect (2), as shown in FIG. 8 and FIG. 9 for example, wherein the substrate bonding means 40A has a mounting means 21 for mounting the first substrate 11 thereon, a holding means 41 for holding the second substrate 12, and a rotating means 43 for rotating the holding means 41, the rotating means being coupled with the holding means 41; and a controller 50 for controlling spacing between the mounting means 21 and the holding means 41 and for controlling the rotating means 43 to allow the second substrate 12 held with the holding means 41 to be brought into contact with the resin film 13 wherein the outer peripheral section 14 is maintained in the uncured state and the inner section 15 is cured into the semi-cured state such that the one end of the outer peripheral section 14 is determined as the starting point 16, and the boundary line between the contact portion and the noncontact portion moves in the one direction from the starting point 16 to the opposite end while the pressing force is applied.

According to the configuration of this Aspect, since the second substrate 12 is held with the holding means 41 and rotated to be brought into contact with the resin film on the first substrate 11, the substrate bonding step can be easily automated. In addition, the program manipulation of the substrate bonding step can be achieved, and in this case, while the spacing between the mounting means 21 and the holding means 41 is being adjusted, the rotating means 43 is controlled, and therefore the boundary line between the contact portion and the noncontact portion can be moved in one direction.

The manufacturing apparatus 10D according to Aspect (5) is a manufacturing apparatus of Aspect (4), as shown in FIG. 16 and FIG. 17 for example, further comprising: a substrate thickness measuring means 70 for measuring a thickness of the substrate; wherein the substrate bonding means 40 is for adjusting the spacing between the mounting means 21 and the holding means 41, based on thickness data of at least either one of the first substrate 11 and the second substrate 12 obtained by the substrate thickness measuring means 70.

According to the configuration of this Aspect, the thickness of the first substrate or the second substrate can be obtained in advance with the substrate thickness measuring means 70, and therefore the height of the mounting means 21 or the holding means 41 can be adjusted at the substrate bonding.

The manufacturing apparatus 10C according to Aspect (6) is a manufacturing apparatus of Aspect (1) or Aspect (2), as shown in FIG. 14 and FIG. 15 for example, wherein the resin film forming means 20 has a slit coater 22 to feed a resin in the liquid state from a resin feeding slit and to apply the liquid state resin film 13 on the first substrate 11, the resin feeding slit being disposed in parallel with a surface of the first substrate 11, the surface being for forming the resin film thereon, the slit coater being movable perpendicularly to the resin feeding slit and movable in parallel with the surface of the first substrate 11, and applies the liquid state resin film 13 on the first substrate 11, the semi-curing means 30 has the ultraviolet irradiation means 31 for irradiating the ultraviolet light to the liquid state resin film 13 formed on the first substrate 11 with the resin film forming means 20, and the ultraviolet irradiation means 31 has an ultraviolet irradiation slit disposed in a parallel direction with the resin feeding slit, the ultraviolet irradiation means being constructed integrally in combination with the slit coater 22, the ultraviolet irradiation slit being formed shorter by a specified length in a longitudinal direction between both ends than the resin feeding slit.

Herein, the specified length is generally the width of the outer peripheral section 14 at one end, and the sum at both ends is the double of the width of the outer peripheral section 14 in length. According to the configuration of the present Aspect, since the slit coater 22 and the ultraviolet irradiation means 31 are integrally formed in combination, the ultraviolet light is automatically irradiated after the elapse of a certain period of time after dropping the liquid state resin 13. In addition, since the length of the ultraviolet irradiation slit in the longitudinal direction between both ends is formed shorter by a specified length than the length of the resin feeding slit in the longitudinal direction, unirradiated region, that is, uncured region is automatically formed in the outer peripheral section 14 without the shielding means. Typically, the specified time is the value calculated by division, that the spacing between the resin feeding slit and the ultraviolet irradiation slit plus the width of the outer peripheral section 14 is divided by the scanning speed.

To achieve the above object, a bonded member manufacturing method according to Aspect (7) of the present invention is, as shown in FIG. 2 for example (see FIG. 3 for each component), a manufacturing method wherein a first substrate 11 and a second substrate 12 are bonded together, comprising: a resin film forming step (Step 2) of forming a liquid state resin film 13 on the first substrate 11; a semi-curing step (Step 4) of maintaining an outer peripheral section 14 of the resin film 13 formed through the resin film forming step (Step 2) in an uncured state and curing an inner section 15 surrounded by the outer peripheral section 14 in a semi-cured state; and a substrate bonding step (Step 6) of bonding the first substrate 11 and the second substrate 12 together by bringing the second substrate 12 into contact with the resin film 13 wherein the outer peripheral section 14 is in the uncured state and the inner section 15 is in the semi-cured state, such that one end of the outer peripheral section 14 is determined as a starting point 16 of the contact so that a boundary line between a contact portion and a noncontact portion moves in one direction from the starting point 16 to an opposite end of the outer peripheral section while applying pressing force to the second substrate, the contact portion being already contacted and the noncontact portion being not yet contacted in bringing the second substrate 12 into contact with the resin film.

According to the configuration of this Aspect, even if one of the substrates is a thin substrate when two substrates are bonded together to produce the bonded member, the manufacturing method of the bonded member can be provided such that (1) since the inner section 15 of the resin film 13 is semi-cured, thereby the viscosity of the resin increases, and because one substrate is provisionally bonded to the other substrate when the one substrate is bonded to the other substrate, the relative misalignment can be prevented from occurring between the substrates, (2) a distortion (undulation) can be prevented from occurring on a surface of the thin substrate, and the uniformity in the film thickness can be achieved.

The manufacturing method according to Aspect (8) is a manufacturing method of Aspect (7), as shown in FIG. 2 and FIG. 3 for example, wherein the semi-curing step (Step 4) has an ultraviolet irradiation step (Step 4-1) of irradiating ultraviolet light to cure the resin film 13, and a light blocking step of blocking the ultraviolet light to be irradiated by the ultraviolet irradiation step (Step 4-1) to the outer peripheral section 14 of the resin film 13 formed through the resin film forming step (Step 2).

The light blocking step may preferably be a shielding step (Step 4-2) that shields the outer peripheral section 14 from the irradiation of the ultraviolet light by the ultraviolet irradiation step (Step 4-1) (typically, the outer peripheral section 14 is covered with the shielding member 32 (STEP 3), to be shielded from the ultraviolet light irradiated thereto).

According to the configuration of the Aspect, by blocking the light through the light blocking step, typically, by shielding the irradiation of the ultraviolet light, the resin film 13 formed on the first substrate 11 can be reliably maintained with the outer peripheral section 14 in the uncured state and the inner section 15 cured in semi-cured state. In addition, by controlling the time of the ultraviolet irradiation or the intensity of the ultraviolet light, the semi-cured state can be adjusted properly.

The manufacturing method according to Aspect (9), is a manufacturing method of Aspect (7) or Aspect (8), as shown in FIG. 5 for example, wherein the second substrate 12 is a transparent polymer film, and in the substrate bonding step (Step 6), the second substrate 12 is pressed toward the first substrate 11 with a roller means 42, the roller means 42 is rolled from the one end side to the other end side of the outer peripheral section 14, and thereby the first substrate 11 is bonded to the second substrate 12.

According to the configuration of the Aspect, when the second substrate 12 is bonded to the resin film 13 applied on the first substrate 11, the roller means 42 is used to the resin film 13 in which the inner section 15 is cured in the semi-cured state, and therefore the relative misalignment can be prevented from occurring between the substrates, the distortion (undulation) can be prevented from occurring on the surface of the thin substrate and the smoothness can be maintained. The uniformity in the film thickness can also be achieved. In addition, there is an advantage that air bubbles are hardly trapped between the second substrate 12 and the resin film 13.

The manufacturing method according to Aspect (10), is a manufacturing method of any one of Aspects (7) to (9), as shown in FIG. 9 for example, wherein in the substrate bonding step (Step 6), a mounting means 21 for mounting the first substrate 11 thereon, a holding means 41 for holding the second substrate 12, and a rotating means 43 for rotating the holding means 41, the rotating means being coupled with the holding means 41 are used, the substrate bonding step (Step 6) includes a step of controlling the spacing between the mounting means 21 and the holding means 41 and also controlling the rotating means 43 to allow the second substrate 12 held with the holding means 41 to be brought into contact with the resin film 13 wherein the outer peripheral section 14 is maintained in the uncured state and the inner section 15 is cured into the semi-cured state such that one end of the outer peripheral section 14 is determined as the starting point 16 of the contact so that the boundary line between a contact portion and a noncontact portion moves in one direction from the starting point 16 to an opposite end of the outer peripheral section 14 while applying pressing force to the second substrate, the contact portion being already contacted and the noncontact portion being not yet contacted in a process of bringing the second substrate 12 into contact with the resin film.

According to the configuration of the Aspect, since the second substrate 12 is held with the holding means 41 and rotated to be brought into contact with the resin film 13 on the first substrate 11, the substrate bonding step (Step 6) can be easily automated. In addition, the program manipulation of the substrate bonding step (Step 6) can be achieved, and in this case, the rotating means 43 is controlled while the spacing between the mounting means 21 and the holding means 41 is adjusted, and therefore the boundary line between the contact portion and the noncontact portion can be moved in one direction.

According to the present embodiments, the relative misalignment can be prevented from occurring between the substrates, the distortion (undulation) can be prevented from occurring on the surface of the thin substrate, and the uniformity in the film thickness can be achieved, even if one of the substrates is a thin substrate when two substrates are bonded together to produce the bonded member.

BRIEF DESCRIPTION OF DRAWINGS

FIG. 1 is a block diagram that illustrates a configuration example of a manufacturing apparatus of bonded member in Embodiment 1;

FIG. 2 is a flow chart showing an example of steps of manufacturing method of the bonded member in Embodiment 1;

FIG. 8 is a block diagram that illustrates a configuration example of a manufacturing apparatus of a bonded member in Embodiment 3;

FIG. 9 shows views that illustrate an example of substrate bonding steps in Embodiment 3;

FIG. 12 is a block diagram that illustrates a configuration example of a manufacturing apparatus of a bonded member in Embodiment 5;

FIG. 16 is a block diagram that illustrates a configuration example of a manufacturing apparatus of a bonded member in Embodiment 7;

Figure 3:
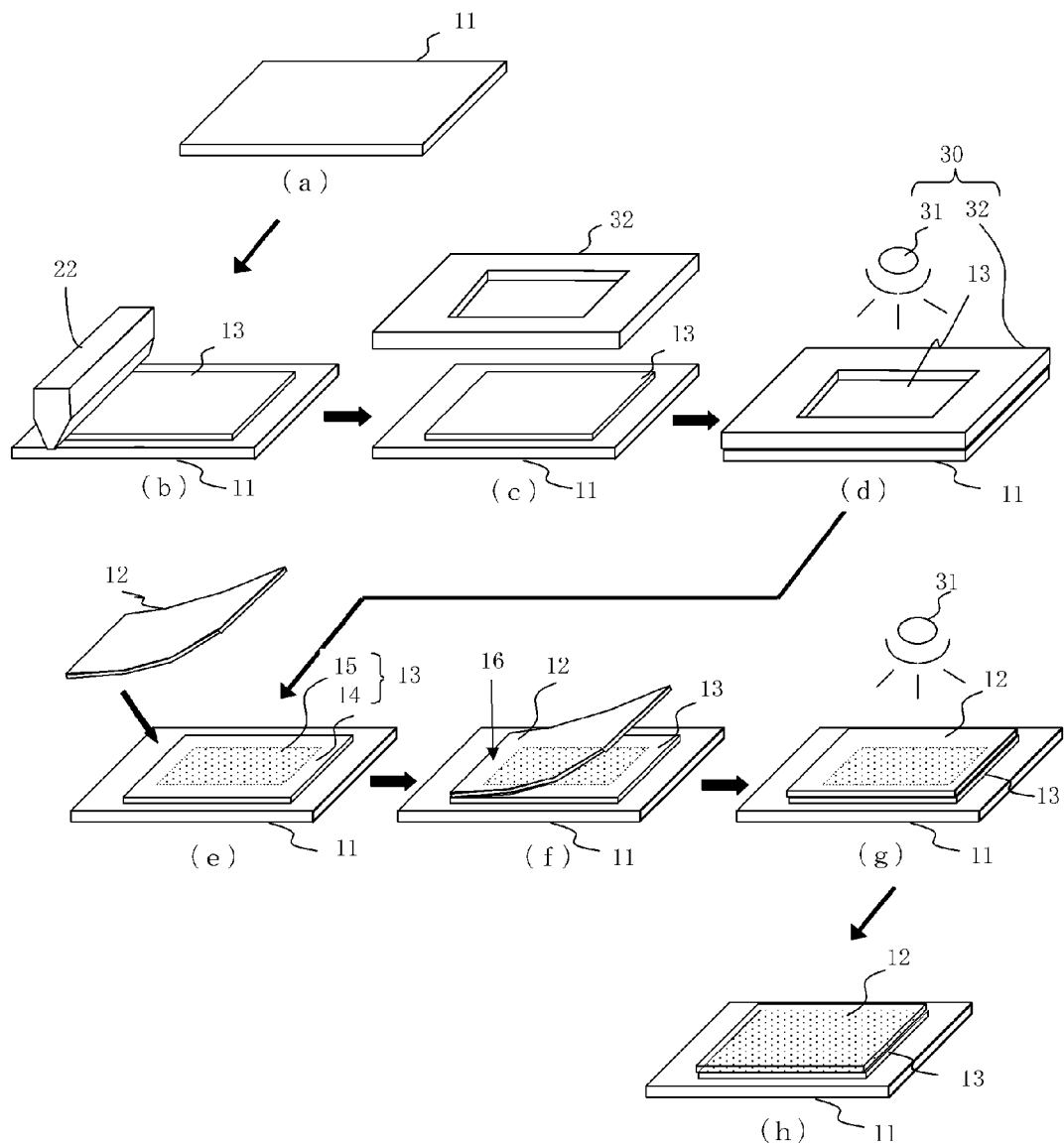
FIG. 3 is a view that illustrates a process in each section of the manufacturing apparatus of the bonded member in Embodiment 1.

This application is based on the Patent Applications No. 2011-218643 filed on Sep. 30, 2011 in Japan, the contents of which are hereby incorporated in its entirety by reference into the present application, as part thereof.

The present invention will become more fully understood from the detailed description given hereinbelow. Further range of application of the present invention will become more clear from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiments. Among the disclosed changes and modifications, those which may not literally fall within the scope of the patent claims constitute, therefore, a part of the present invention in the sense of doctrine of equivalents.

DETAILED DESCRIPTION OF THE PREFERRED EMBODIMENT

Hereinafter, embodiments of the present invention will be described with reference to the drawings. In the drawings, the sections identical with or corresponding to each other are denoted by the same reference numeral, and the redundant description is not repeated.

Embodiment 1

Embodiment 1 is described such that, in an example in which an ultraviolet shielding means as a light blocking means is used to maintain an outer peripheral section of the resin film in an uncured state and cure an inner section in a semi-cured state, a first substrate is mounted on a mounting means, while a roller means is used to press a second substrate toward the first substrate, the roller means is rolled from one end section to the other end section of the outer peripheral section, and therefore the second substrate is bonded to the first substrate.

Figure 5:
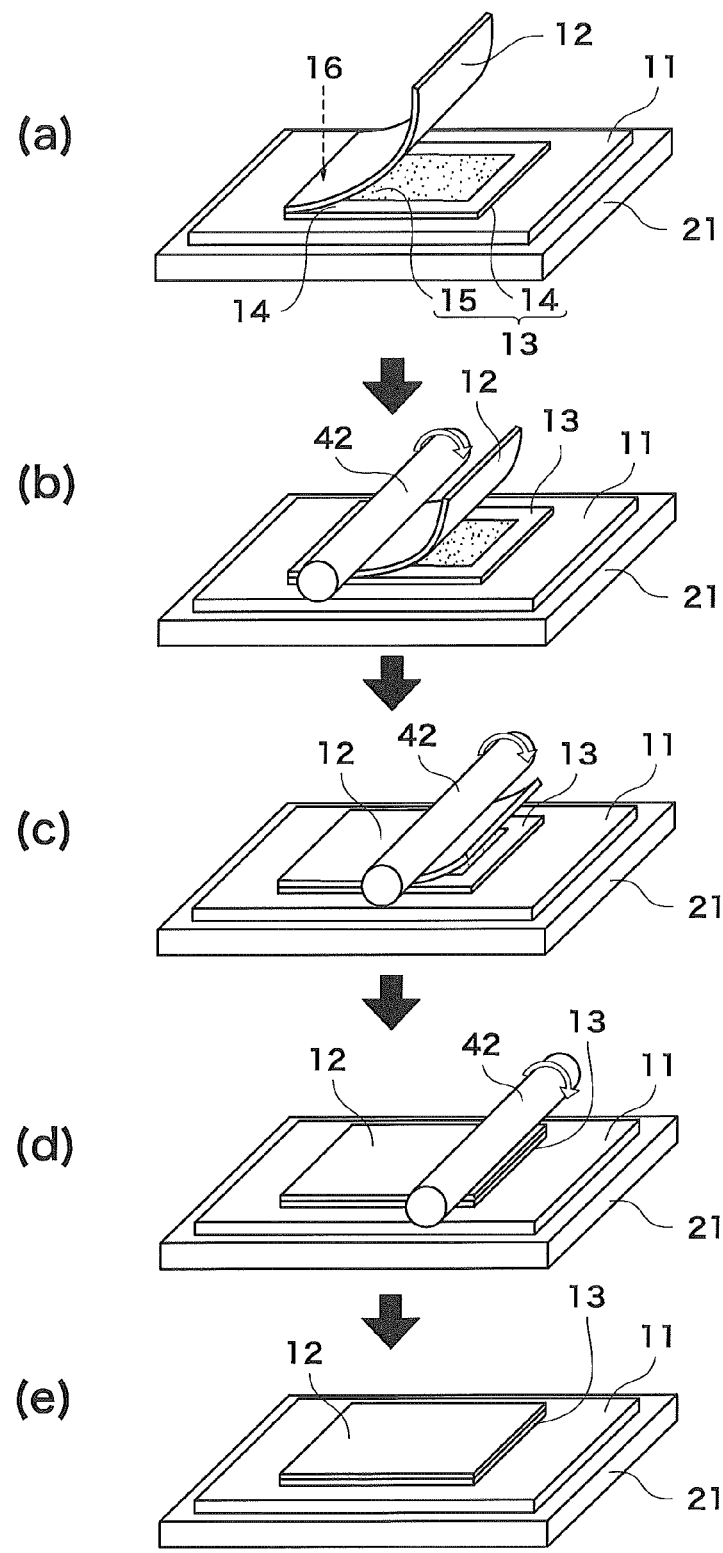
FIG. 5 shows views that illustrate an example of substrate bonding steps of the bonded member in Embodiment 1.

FIG. 1 shows a configuration example of a manufacturing apparatus 10 of a bonded member in Embodiment 1. FIG. 3 and FIG. 5 should be referred to for each part of the manufacturing apparatus 10 of the bonded member. In FIG. 1, the manufacturing apparatus 10 of the bonded member is an apparatus for bonding the first substrate 11 and the second substrate 12 together. The manufacturing apparatus 10 of the bonded member is provided with a resin film forming means 20 that forms a liquid state resin film 13 on the first substrate 11, a semi-curing means 30 that maintains an outer peripheral section 14 of the resin film 13 formed with the resin film forming means 20 in an uncured state and cures an inner section 15 surrounded with the outer peripheral section 14 in a semi-cured state, and a substrate bonding means 40 that brings the second substrate 12 into contact with the resin film 13 and bonds the first substrate 11 and the second substrate 12 together while applying pressing force. Here, the outer peripheral section 14 of the resin film 13 is in the uncured state and its inner section 15 is in the semi-cured state when the second substrate 12 is brought into contact with it. Bonding can be conducted such that, for example, one end of the outer peripheral section 14 of the resin film 13 is set as a starting point 16, the second substrate is brought into contact with the resin film so that a boundary line between a contact portion and a noncontact portion moves from the starting point 16 to the opposite end in one direction while the pressing force is applied, and the second substrate is bonded to the first substrate.

The description is made of an example where the first substrate 11 is an optical device such as liquid crystal panel and the second substrate 12 is a film-like thin substrate. The second substrate 12 may be a transparent film that protects the optical device from contamination, and preferably for example a polycarbonate (PC) film that is used for optical compensation in a case of being used in a mobile phone and a cycloolefin (COP) film in a case of being used in a touch panel. The resin film 13 is used as a bonding agent (adhesive) that bonds the first substrate 11 and the second substrate 12 together. A transparent, adhesive, ultraviolet curable polymeric resin can be used for the resin film 13, and modified acrylate having a main chain of epoxy, polyester, or urethane, for example, can be used. The resin film 13 (bonding agent) is in a liquid state during application, cured with ultraviolet irradiation, and loses its flowability.

Regarding the cured state of the resin film 13, the state where the film has sufficient hardness as a product is referred to as a fully cured state, and the semi-cured state means the state where cure degree is lower than that in the fully cured state and adhesiveness to the second substrate 12 remains. The semi-cured state also means the state where the modulus of elasticity (stress/distortion) is lower than that in the fully cured state. The uncured state means the state where cure treatment (ultraviolet irradiation) is not conducted or the state where, even if the cure treatment is conducted, it is not sufficient and the liquid state is maintained, that is, the state where the flowability is maintained and its viscosity is lower than that in the semi-cured state.

The resin film forming means 20 has a mounting means 21 that the first substrate 11 is mounted on, an application means 22 that applies resin as the bonding agent 13 onto the first substrate 11, and a scanning means 23 that scans (moves) the application means 22 with respect to the mounting means 21. In this Embodiment, a table is used as the mounting means 21, and the example in which the first substrate 11 is horizontally held on the table 21 with the bonding surface directed upward is described. The direction of the bonding surface of the substrate is, however, not limited to the horizontal direction, but may be directed to any direction, and may be directed downward (see FIG. 7). Furthermore, in this Embodiment, the substrate is held with vacuum suction. Edges of the substrate may be, however, grasped so as to be caught with claws instead of the vacuum suction, or the substrate may be held with static electricity or an adhesive with weak adhesive force.

In this Embodiment, as the application means 22, the slit coater that feeds the resin in the liquid state from a resin feeding slit parallel to the surface of the first substrate 11 is used, and the scanning direction of the scanning means 23 is determined to the direction parallel to the surface of the first substrate 11 and perpendicular to the resin feeding slit. By dropping of liquid state resin from the slit coater 22 to a linear region on the first substrate 11 immediately below the slit coater and scanning the slit coater 22 with the scanning means 23, the resin film 13 in the liquid state is formed on the surface of the first substrate 11. The thickness of the resin film 13 is, for example, about 50 through 200 μm. The resin film 13 tends to bulge in the outer peripheral section 14 in comparison with the inner section 15. Such phenomenon can be considered due to the action of the flowability and surfacetension of the resin film 13. The slit coater 22 is appropriately fed with the resin from a resin container (not shown) that is disposed above the slit coater 22. As an alternative to the slit coater 22, a nozzle (including multiple nozzles) may drop the liquid state resin, and the scanning direction by the scanning means 23 may be determined to two directions that are in parallel with the surface of the first substrate 11 and perpendicular to each other. However, the slit coater 22 has the advantage of quickly applying the resin in thin film.

The semi-curing means 30 has an ultraviolet irradiation means 31 that irradiates ultraviolet light for curing the resin film 13, and a light blocking means 32 that blocks the ultraviolet light by the ultraviolet irradiation means 31 from entering into the outer peripheral section 14 of the resin film 13 formed with the resin film forming means 20. In this Embodiment, as the light blocking means 32, a shielding means that shields the outer peripheral section 14 from the irradiation of the ultraviolet light by the ultraviolet irradiation means 31 is used.

As the ultraviolet irradiation means 31, for example, an ultraviolet (UV) lamp or an ultraviolet light-emitting diode (UVLED) lamp that can irradiate the entire surface of the first substrate 11 can be used. As the shielding means 32, such a frame-like blocking plate that allows the ultraviolet light to pass within the frame and block the ultraviolet light at the portion of the frame can be used. For example, a metal frame with its inner part removed may be used, and a glass plate in which the frame is formed with an ultraviolet blocking filter containing zinc oxide and the like may be used. By blocking with the frame portion the ultraviolet light from the ultraviolet irradiation means 31, the outer peripheral section 14 of the resin film 13 formed with the resin film forming means 20 can be maintained in the uncured state, and the inner section 15 surrounded by the outer peripheral section 14 can be cured in the semi-cured state.

In this state, the inner section 15 comes into the semi-cured state, and thus the flowability is lost, but adherence remains, and when the inner section 15 comes into contact with the second substrate 12, the inner section 15 can be bonded to the second substrate 12. In addition, the inner section 15 is cured from the liquid state in which the surface is flat, and thus the inner section 15 comes into the semi-cured state with maintaining flatness of the surface and the uniformity of the film thickness. Therefore, the viscosity of the inner section 15 of the resin film 13 formed on the first substrate 11 increases, and when the second substrate 12 is going to be bonded to the first substrate 11, the second substrate 12 is fixed and provisionally bonded on the first substrate 11 without drifting of the relative position to the first substrate 11. In addition, because the second substrate 12 is provisionally bonded to the first substrate 11, even after the pressing force by a holding means 41 or a roller means 42 is eliminated, the second substrate 12 is not displaced from the first substrate 11. Thus, because the second substrate 12 is not required to be held, there is no means that constitutes an obstacle to the ultraviolet irradiation, and the ultraviolet light can be uniformly irradiated to the inner section 15 of the resin film 13, the distortion (undulation) can be prevented from occurring on the surface of the second substrate 12. The outer peripheral section 14 of the resin film 13 remains in the uncured state.

The substrate bonding means 40 has the mounting means 21 that the first substrate 11 is mounted on and a roller means 42 that while pressing the second substrate 12 toward the first substrate 11, rolls from one end side to the other end side of the outer peripheral section 14, and thus bonds the second substrate 12 to the first substrate 11. In use of the roller means 42, the mounting means 21 of the resin film forming means 20 can be used in common as the mounting means 21 that the first substrate 11 is mounted on. With respect to the roller means 42, the table 21 is constructed to be relatively movable to a perpendicular direction to a shaft of the roller means 42 in a horizontal plane and moved, and therefore the roller means 42 rotates.

When the second substrate 12 is brought into contact with one end side of the outer peripheral section 14 by the roller means 42, the second substrate 12 comes into contact with the bulged portion of the resin in the outer peripheral section 14, and the contact portion spreads from the outside to the inside. Then, the uncured portion that is bulged moves toward the inner section 15 and is eventually pressed against the second substrate 12, and the thickness of the resin film becomes the same in the outer peripheral section 14 and the inner section 15. Accordingly, one end of the outer peripheral section 14 is determined as the starting point 16, and the second substrate is brought into contact with the resin film 13 on the first substrate 11 so that a boundary line between a contact portion and a noncontact portion moves from the starting point 16 to the opposite end in one direction while the pressing force is applied on the second substrate 12. The contact portion of the resin film 13 gradually spreads and eventually reaches the outer peripheral section opposite to the starting point 16. At this portion, the resin is in the uncured state, and therefore a part of the resin flows, and the second substrate 12 is uniformly pressed and becomes flattened against the first substrate 11 through the resin film 13. When the roller means 42 passes across the second substrate 12 from one end to the other end, the second substrate 12 is bonded to the first substrate 11 through the resin film 13 and remains on the side of the first substrate 11. Then, the second substrate 12 is fixed and provisionally bonded on the first substrate 11 without drifting of the relative position to the first substrate 11. In addition, a flat interface is formed between the second substrate 12 and the resin film 13, and the bonded member that has no or very small distortion (undulation) on the surface of the second substrate 12 is formed.

The controller 50 controls the entire manufacturing apparatus 10 of the bonded member and each component thereof and provides the functions as the manufacturing apparatus 10 of the bonded member.

FIG. 2 shows a process flow example of the manufacturing method of the bonded member. Furthermore, FIG. 3 illustrates a process in each section of the manufacturing apparatus 10 of the bonded member (hereinafter, merely referred to as the "manufacturing apparatus") in association with the process flow.

First, the first substrate 11 is mounted on the mounting means 21 of the manufacturing apparatus 10 (Substrate mounting step: (a), Step 1). The first substrate 11 is, for example, a liquid crystal panel (hereinafter, the first substrate 11 is merely referred to as a "substrate"). The thickness of the substrate 11 is the order of 0.3 to 2 mm. Next, liquid resin is applied on the substrate 11 with the application means 22, and the resin film 13 in the liquid state is formed on the substrate 11 (resin film forming step: (b), Step 2). In this Embodiment, the slit coater is used as the application means 22, and the resin film 13 is formed to achieve specified film thickness. The specified film thickness is 50 to 200 μm. Other application means 22 can be used as an alternative to the slit coater. For example, the liquid resin that is applied linearly through a discharge nozzle can be leveled by a brush and the like to achieve the specified thickness to form the resin film.

Figure 4A:
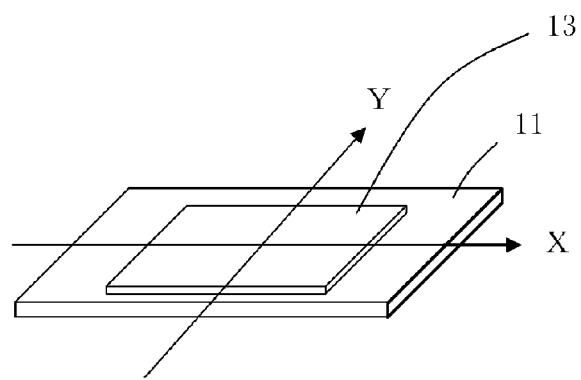
FIG. 4A shows a perspective view that schematically indicates the distribution of film thickness of a resin film in liquid state which is formed through a resin film forming step.
Figure 4B:
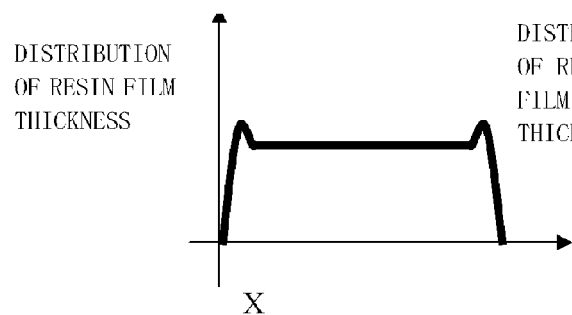
FIG. 4B shows a view that schematically indicates the distribution of film thickness of a resin film in liquid state which is formed through a resin film forming step.
Figure 4C:
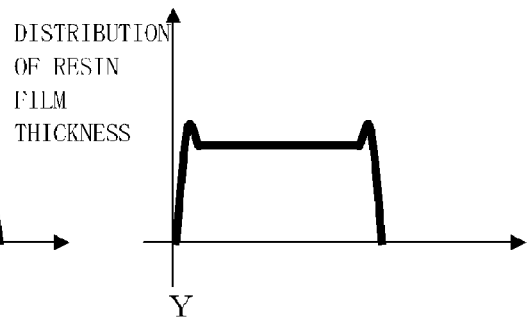
FIG. 4C shows a view that schematically indicates the distribution of film thickness of a resin film in liquid state which is formed through a resin film forming step.

FIG. 4A, FIG. 4B and FIG. 4C schematically show the distribution of film thickness of the resin film 13 in liquid state which is formed through the resin film forming step (Step 1). FIG. 4A shows the direction of application of the resin film 13 on the first substrate 11, and FIG. 4B and FIG. 4C respectively show the distribution of film thickness of the resin film 13 in an X-direction and a Y-direction. As shown in FIG. 4B and FIG. 4C, the outer peripheral sections 14 at four sides tend to bulge in comparison with the inner section 15. Therefore, when the film-like second substrate 12 (hereinafter, the second substrate is referred to as a "substrate film") is bonded in this state, the resin film thickness cannot be made uniform, and air bubbles may be trapped during the bonding process. Thus, this embodiment adopts the following means and processes.

Going back to FIG. 2 and FIG. 3, the description is continued. First, a shielding means 32 that covers the outer peripheral sections 14 at four side of the resin film 13 formed on the substrate 11 is disposed above the resin film 13 ((c), Step 3). The outer peripheral sections 14 at four side of the resin film 13 formed on the substrate 11 are covered with the shielding means 32, and the ultraviolet light is irradiated from above with the ultraviolet irradiation means 31 (Semi-curing step: (d), Step 4). Since the outer peripheral sections 14 at four sides of the resin film 13 are shielded with the shielding means 32, the outer peripheral sections 14 are not irradiated with the ultraviolet light and maintain the uncured liquid state, and the inner section 15 that is not shielded with the shielding means 32 is semi-cured.

Next, the substrate film 12 is held with the holding means 41 (not shown) (Second substrate holding step: (e), Step 5). The substrate film 12 is, for example, a protective film for protecting the display surface of the liquid crystal panel 11. The thickness of the substrate film 12 is the order of 0.05 to 0.2 mm. For example, the substrate film 12 is held with the holding means 41 that is flexible and has a convex and curved surface to the lower side, and the substrate bonding means 40 holds one end of the holding means 41 at a specified distance above the substrate 11, that is, at a height so as to come into contact with the resin film 13.

Next, in the resin film 13 where the outer peripheral section 14 is in the uncured state and the inner section 15 is in the semi-cured state, the uncured outer peripheral section 14 is determined as the starting point 16, the substrate film 12 is brought into contact with the resin film 13, the pressing force applied, and the substrate 11 and the substrate film 12 are combined and bonded with each other. In this Embodiment, the substrate 11 and the substrate film 12 are bonded by using the roller means 42, determining one end of the outer peripheral section 14 as the starting point 16, bringing into contact so that a boundary line between a contact portion and a noncontact portion moves in one direction from the starting point 16 to the opposite end while the pressing force is applied (Substrate bonding step: (f), Step 6).

FIG. 5 illustrates an example of substrate bonding step (Step 6) of the bonded member in Embodiment 1. The substrate 11 in which the resin film 13 where the outer peripheral section 14 is in the uncured state and the inner section 15 is in the semi-cured state is formed is placed on the table 21. The outer peripheral sections 14 at four sides of the resin film 13 are uncured and in the liquid state, and the inner section 15 is in the semi-cured state and its viscosity is increased in comparison with that in the liquid state. In this Embodiment, the substrate 11, the resin film 13, and the substrate film 12 are interposed between the table 21 and the roller means 42, the roller means 42 is rotated on the substrate film 12, and therefore the substrate film 12 is bonded to the substrate 11 through the resin film 13.

Figure 6:
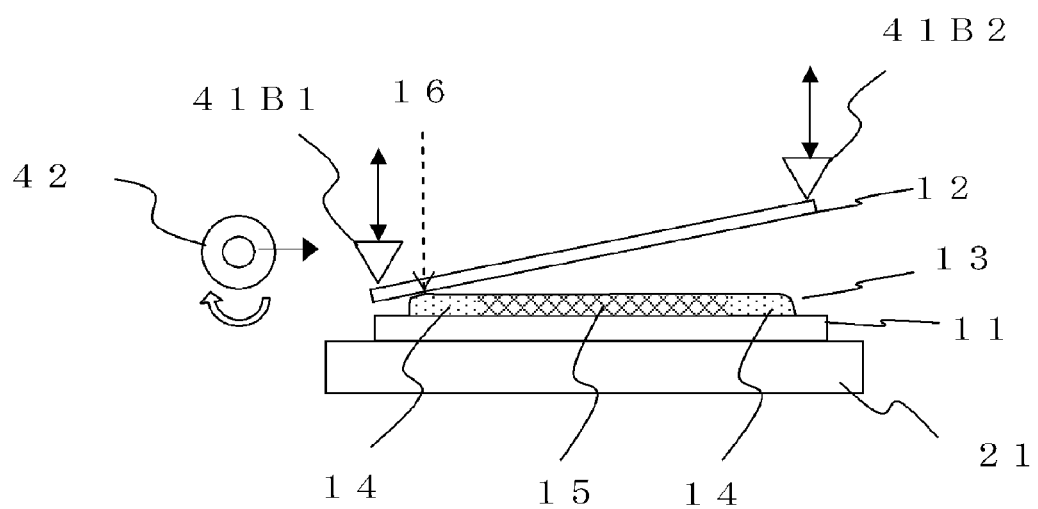
FIG. 6 is a view that illustrates an example of a holding means in Embodiment 1.

FIG. 6 illustrates an example of the holding means in Embodiment 1. Both sides of the substrate film 12 is held by the holding means 41B1 and 41B2 through vacuum suction, electrostatic absorption, adhesive with weak adhesion, or mechanical holding (for example, holding clip) before the roller means 42 presses. One end of the substrate film 12 transferred in an upper portion of the substrate 11 is first brought into contact with liquid at the starting point 16 of the bonding as an uncured portion of the resin film 13 by the holding means 41B1. Then, the holding means 41B1 retracts to an original retracting position, and the substrate film 12 is brought into contact with the resin film 13 by using the roller means 42 such that one end of the outer peripheral section 14 is determined as the starting point 16, and the boundary line between the contact portion and the noncontact portion moves from the starting point 16 to the opposite end in one direction while the pressing force is applied, and the substrate film 12 is bonded to the substrate 11. At that time, the other end of the substrate film 12 is held by the holding means 41B2 until the other end of the substrate film 12 is bonded to the uncured opposite end of the resin film 13 on the substrate 11.

Going back to FIG. 5, the description is continued. As the roller means 42 moves on the substrate film 12 from one end to the other end, the substrate film 12 is bonded to the substrate 11 (from a to e). In other words, after the substrate film 12 is pressed on the substrate 11 by the roller means 42, the substrate film 12 is brought into close contact with the resin film 13 and bonded to the substrate 11, and after the roller means 42 passes, the bonded member can be obtained.

When the substrate film 12 is brought into contact with one end side of the outer peripheral section 14 by the roller means 42, the substrate film 12 comes into contact with the bulged portion of the resin in the outer peripheral section 14, and the contact portion spreads from the outer peripheral side to the inner side. Then, the uncured portion that is bulged moves toward the inner section and is eventually pressed against the substrate film 12, and the thickness of the resin film 13 becomes the same in the outer peripheral section 14 and the inner section 15. Accordingly, one end of the outer peripheral section 14 is determined as the starting point 16, the substrate film 12 is brought into contact with the resin film 13 on the first substrate 11 so that the position is changed from the starting point 16 to the opposite end in one direction while the pressing force is applied on the substrate film 12. The contact portion of the resin film 13 gradually spreads and eventually reaches the outer peripheral section 14 opposite to the starting point 16. The position of the holding means 41B2 moves closer to the resin film 13 as the substrate film 12 is bonded to the resin film 13. At this portion, there is an uncured state portion, and therefore a part of the resin flows, and the second substrate 12 is uniformly pressed and becomes flattened against the first substrate 11 through the resin film 13. After the roller means 42 passes, a flat interface is formed between the second substrate 12 and the resin film 13 in the entire bonded member. In addition, the relative misalignment is absent between the substrates, and the bonded member that has no or very small distortion (undulation) on the surface of the second substrate 12 is formed.

Next, the entire resin film 13 interposed between the substrate 11 and the substrate film 12 that have been bonded is fully cured with the ultraviolet irradiation means 31 ((g), Step 7) (see FIG. 3). Accordingly, the bonded member in which the substrate 11 and the substrate film 12 are bonded together using the bonding agent 13 is finished. For example, the display section of the liquid crystal panel as the first substrate 11 is protected by the substrate film as the second substrate 12.

Regarding to the means that conducts complete cure, a device separate from a bonding apparatus that conducts the processes from the resin film forming process to the substrate bonding process (for example, ultraviolet irradiation device) may be used.

As described above, according to the present embodiment, the relative misalignment can be prevented from occurring between the substrates, the distortion (undulation) can be prevented from occurring on the surface of the thin substrate, and the uniformity in the film thickness can be achieved, even if one of the substrates is a thin substrate when two substrates are bonded to produce the bonded member.

That is, in a case where the thin substrate as the film-like substrate is used, the following effects can be obtained. (1) The inner section 15 of the resin film 13 is semi-cured with a specified film thickness except for the outer peripheral sections 14 at four sides, the viscosity of the resin 13 is increased, and therefore the substrate film 12 is provisionally bonded to the substrate 11 when the substrate film 12 is bonded. Therefore, when the holding means 41 that holds the substrate film 12 is removed, the state where the substrate film 12 is bonded to the substrate 11 is maintained, and the substrate film 12 is not displaced from the substrate 11. (2) The fluctuation of the film thickness is eliminated in the subsequent production steps, and the film thickness can be uniformly maintained, and therefore the distortion (undulation) does not occur on the surface of the substrate film 12 after bonding the substrate film 12. In addition, even if the undulation occurred, the undulation would be very small. (3) Because the outer peripheral sections 14 at the four sides of the resin film 13 is in the uncured state, and the outer peripheral section 14 of the resin film 13 is determined to be the starting point 16 of the bonding, air bubbles are hardly trapped at the moment when the substrate film 12 comes into contact with liquid film of the resin film 13. (4) Because the substrate film 12 is bonded under the uncured state of the outer peripheral sections 14 at the four sides of the resin film 13, the bulged portion of the outer peripheral section 14 becomes flattened, and the entire film thickness can be made uniform.

Embodiment 2

In Embodiment 1, an example in which the substrate film 12 is combined and bonded from above the substrate 11 through the resin film 13 is described. Here, in Embodiment 2, an example is described such that the surface where the resin film 13 of the substrate 11 is formed is faced downward, and the substrate film is bonded from below. In comparison with Embodiment 1, although the first substrate 11 and the second substrate 12 are placed upside down, the other configurations are the same. Different points from Embodiment 1 will be principally described.

Figure 7:
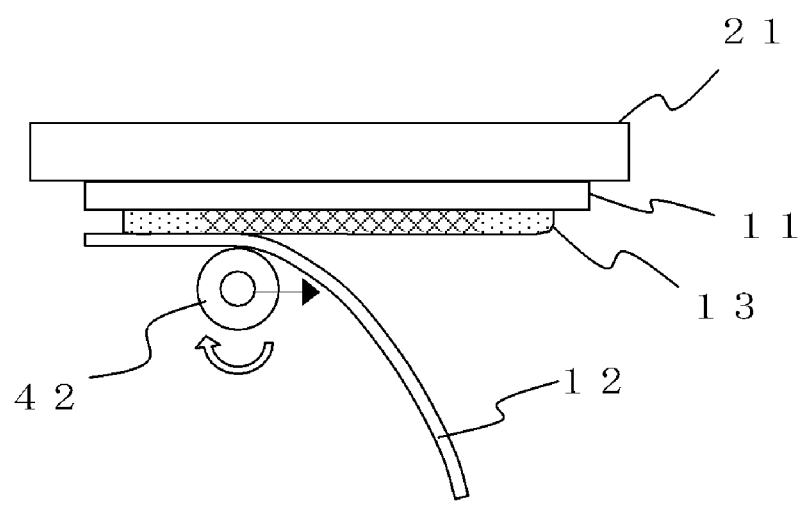
FIG. 7 is a view that schematically illustrates a substrate bonding means in Embodiment 2.

FIG. 7 schematically illustrates the substrate bonding means in Embodiment 2. The resin film 13 in which the outer peripheral section 14 is in the uncured state and the inner section 15 is in the semi-cured state is formed on the first substrate (substrate) 11, the substrate is turned upside down, and the substrate 11 where the resin film 13 is formed is held on the table 21 through the vacuum suction, for example. Since the outer peripheral section 14 of the resin film 13 is in the uncured state, the resin film 13 has its flowability. However, the resin film 13 is not dropped due to the action of the surfacetension. One end that becomes the starting point of the bonding of the flexible second substrate (film) 12 is interposed and held with the holding means 41B1 similar to that shown in FIG. 6 (the holding means is not shown in FIG. 7). The height of the holding means 41B1 is adjusted so that when the substrate film 12 is held in a horizontal position, the substrate film 12 is brought into contact with the resin film 13. The flexible substrate film 12 is interposed and held with the holding means 41B1 so as to have a curved surface convex to the upper side. In this Embodiment, the other end of the substrate film 12 is spontaneously drooped down by gravity, and therefore the other end of the substrate film 12 may not be held. Furthermore, the other end of the substrate film 12 may be held by the holding means 41B2 as described above, and the holding means 41B2 may be linked and moved with the rotation of the roller means 42.

The roller means 42 is pushed to the substrate film 12 from under side. Since the substrate film 12 is flexible, the substrate film 12 comes into contact with the resin film 13 at the one end, but the substrate film does not come into contact with the resin film 13 at the other section and bends downward. One end of the outer peripheral section 14 is determined as the starting point 16, and the roller means 42 moves from the starting point 16 to the opposite end while applying the pressing force. At this time, as the roller means 42 moves, the substrate film 12 is brought into contact while the boundary line between the contact portion and the noncontact portion moves in one direction. Accordingly, the substrate 11 and the substrate film 12 are bonded together.

The other configurations and the process flow are the same as those in Embodiment 1, and the same effects can be provided.

Embodiment 3

In Embodiment 3, an example in which the ultraviolet shielding means is used to maintain the outer peripheral section of the resin film in the uncured state, and the inner section is cured into the semi-cured state and in which the first substrate (substrate) is mounted on the mounting means (table), the second substrate (substrate film) is held with the holding means and pressed gradually closer to the first substrate side, and the second substrate is bonded to the first substrate is described.

FIG. 8 shows a configuration example of the manufacturing apparatus 10A of the bonded member in Embodiment 3. In comparison with Embodiment 1, although the contents of the substrate bonding means 40A are different, the other configurations are the same. Different points from Embodiment 1 will be principally described. The processes of the substrate bonding means 40A should be referred to FIG. 9. The substrate bonding means 40A has a table 21 that the substrate 11 is mounted on (that can be commonly used with the table of the resin film forming means 20), and the holding means 41 that holds the substrate film 12, a rotating means 43 that is coupled to the table 21 to rotate the holding means 41 about a rotational shaft 43B, a rotational shaft position adjusting means 44 that adjusts the position of the rotational shaft 43B with respect to the table 21.

The controller 50 controls the rotating means 43 and the rotational shaft position adjusting means 44 to allow the substrate film 12 to be brought into contact with the resin film 13 in which the outer peripheral section 14 is maintained in the uncured state and the inner section 15 is cured into the semi-cured state such that one end of the outer peripheral section 14 is determined as the starting point 16, and the boundary line between the contact portion and the noncontact portion moves from the starting point 16 to the opposite end in one direction while the pressing force is applied, and the substrate film 12 is bonded to the first substrate 11.

The rotating means 43 has the rotational shaft 43B as a rotational shaft, a driving part 43C that drives the rotation of the rotational shaft 43B, the holding means 41 that is coupled to the rotational shaft 43B, and a hinge part 43A that urges the mounting means 21 to an open side. The holding means 41 holds the substrate film 12 through the vacuum suction, for example. The rotational shaft position adjusting means 44 allows the position of the rotational shaft 43B to move by a small distance in the vertical direction while the rotational shaft 43B is maintained in parallel with the surface of the table 21. The controller 50 controls the spacing between the mounting means 21 and the holding means 41 and also controls the rotating means 43. These controls are conducted through the control of the rotation angle of the holding means 41 by the driving part 43C of the rotating means 43, the control of the position of the rotational shaft 43B by the rotational position adjusting means 44, and the control of the position of the mounting means 21 for example. The driving part 43C and the rotational shaft position adjusting means 44 are controlled such that the substrate film 12 is brought into contact with the resin film 13 in which the outer peripheral section 14 is in the uncured state and the inner section 15 is in the semi-cured state so that one end of the outer peripheral section 14 is determined as the starting point 16, and the boundary line between the contact portion and the noncontact portion moves from the starting point 16 to the opposite end in one direction while the pressing force is applied.

The substrate bonding means 40A holds the substrate film 12 with the holding means 41. The controller 50 controls the driving part 43C to decrease the angle between the horizontal plane of the substrate 11 and the holding means 41 and contact to one end of the outer peripheral section 14, and furthermore controls the rotational shaft position adjusting means 44 to gradually raise the position of the rotational shaft 43B.

During the contact, the resin of the outer peripheral section 14 contacts to the bulged portion, and the contact portion spreads from the outer peripheral side to the inner side. Then, the uncured portion that is bulged moves toward the inner side and is eventually pressed on the substrate film, and the thickness of the resin film becomes the same in the outer peripheral section 14 and the inner section 15.

Accordingly, one end of the outer peripheral section 14 is determined as the starting point 16, the second substrate is brought into contact with the resin film 13 on the first substrate 11 so that a boundary line between a contact portion and a noncontact portion moves from the starting point 16 to the opposite end in one direction while the pressing force is applied on the substrate film 12. The contact portion of the resin film 13 gradually spreads and eventually reaches the outer peripheral section 14 opposite to the starting point 16. Because there is the portion in the uncured state at that point, a part of the resin flows, but the substrate film 12 is uniformly pressed on the substrate 11 through the resin film 13, and the flat interface is finally formed between the substrate film 12 and the resin film 13. The controller 50 controls the rotational shaft position adjusting means 44 to gradually lower the position of the rotational shaft 43B at the pressing after the entire surface of the substrate film 12 contacts. When the holding means 41 is released, the bonded member in which the substrate film 12 is bonded to the substrate 11 through the resin film 13 can be obtained. Then, the relative misalignment is absent between the substrates, and the bonded member that has no or very small distortion (undulation) on the surface of the substrate film 12 is formed.

The process flow in Embodiment 3 can adopt that in FIG. 2. Although the details of the substrate bonding process are different, the other processes are the same.

FIG. 9 illustrates an example of the substrate bonding means 40A in Embodiment 3. The substrate 11 on which the resin film 13 is formed is mounted on the table 21. The outer peripheral sections 14 at four sides of the resin film 13 are in the uncured liquid state, and the inner section 15 is in the semi-cured state and its viscosity is increased. The substrate film 12 is held with the holding means 41(a). The substrate bonding means 40A is provided with the rotating means 43 including a hinge part 43A, a rotational shaft 43B, and a driving part 43C. In addition, in order to adjust the spacing at the bonding between the substrate film 12 and the resin film 13 formed on the substrate 11, the rotational shaft position adjusting means 44 is provided to be directly coupled to the driving part 43C and adjusts the vertical position of the rotational shaft 43B for rotating the holding means 41 with respect to the table 21. As the rotational shaft position adjusting means 44, a link mechanism, a guide rail, and the like can be used. The movement of the rotational shaft in the vertical direction is generally driven by an electric motor, and preferably driven by a stepping (stepper) motor.

The controller 50 controls the driving part 43C and the rotational shaft position adjusting means 44, and thereby controls the lifting position of the holding means 41 (the angle of the rotation and the height of the rotational shaft 43B). By rotating the rotational shaft 43B with the driving part 43C, the holding means 41 is rotated through the hinge part 43A, and the angle between the holding means 41 and the table 21 gradually decreases from an opening state of 180° (b). The starting point 16 is determined on the outer peripheral section 14 that is the uncured region of the resin film 13 formed on the substrate 11, and then the substrate film 12 is brought into contact with the resin film 13. Accordingly, the substrate 11 and the substrate film 12 are combined and bonded with each other (c)(d).

Figure 10:
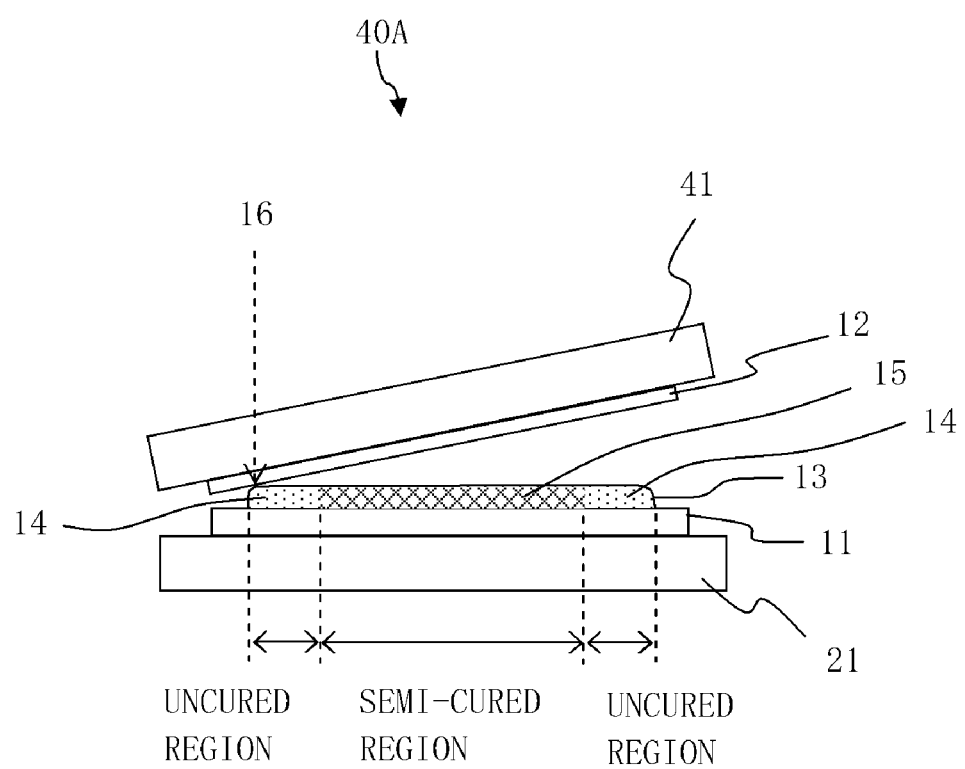
FIG. 10 is a view that illustrates an appearance when a substrate film comes into contact with the resin film.

FIG. 10 illustrates an appearance when the substrate film 12 comes into contact with the resin film 13. The outer peripheral sections 14 at four sides of the resin film 13 on the substrate 11 are in the uncured liquid state. When the substrate film 12 is brought into contact with the starting point 16 of the outer peripheral section 14 that is the uncured region of the resin film 13 on the substrate 11, and the angle of the holding means 41 with respect to the table 21 is gradually decreased, the contact area between the substrate film 12 and the resin film 13 gradually increases. Since the outer peripheral section 14 of the resin film 13 on the substrate 11 is in the uncured liquid state, air bubbles are hardly trapped at the moment when the substrate film 12 comes into contact with liquid film of the resin film 13, and furthermore the substrate film 12 is gradually brought into contact with liquid on the resin film 13, and therefore the substrate film 12 can be bonded to the substrate 11 without trapping air bubbles between the substrate film 12 and the resin film 13 in general.

Going back to FIG. 9, the description is continued. When the bonding is finished, the holding means 41 is returned to the original position (e).

The rotational shaft position adjusting means 44 may be absent. However, the adjustment of the spacing between the substrate film 12 and the substrate 11 is facilitated when the rotational shaft position adjusting means 44 is provided. In addition, instead of controlling the height of the holding means 41 as described above, the position adjusting means may be provided to the table 21 to control the vertical position of the table 21.

Furthermore, instead of providing the rotational shaft position adjusting means 44, a bearing of the rotational shaft 43B may have play, and a spring may urge the rotational shaft toward the table 21 such that the position around the rotational shaft of the holding means 41 is variable. When the bearing has play, the holding means 41 may be urged toward the table 21 with its own weight.

The other configurations and the process flow are the same as those in Embodiment 1, and the same effects can be provided.

Embodiment 4

In Embodiment 3, the case where the holding means 41 has a flat surface, and in Embodiment 4, an example in which the holding means 41 has a convex and curved surface. Because the holding means 41 has a curved surface, in the similar way to the roller means 42, the second substrate (film) can be brought into contact with the resin film 13 successively from the starting point 16 of the outer peripheral section 14 of the resin film 13. It can be said that this is a case where the diameter of the roller means is larger than that in Embodiment 1 (see FIG. 5). When the diameter of the roller means is sufficiently large with respect to size of the substrate, a part of an arc may be cut and the cut part may be the holding means for example (that is, the holding means also serves as the roller means). In addition, the surface of the roller may not be an arc but may be the other convex and curved surface. The other device configurations and the process flow are the same as those in Embodiment 3, and the same effects can be provided.

Figure 11A:
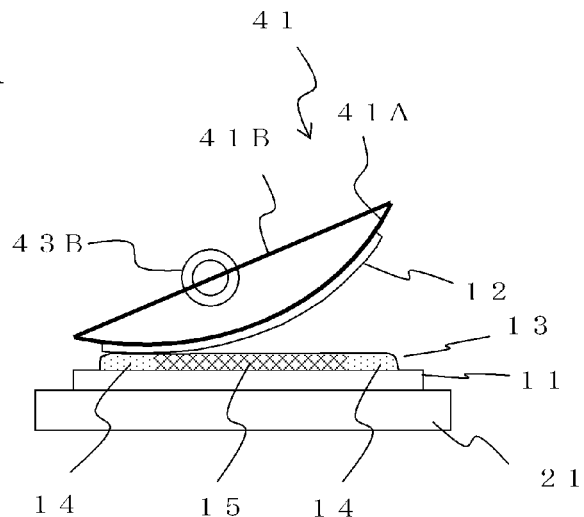
FIG. 11A shows a view that illustrates an example in which the holding means holds a second substrate in a curved shape.
Figure 11B:
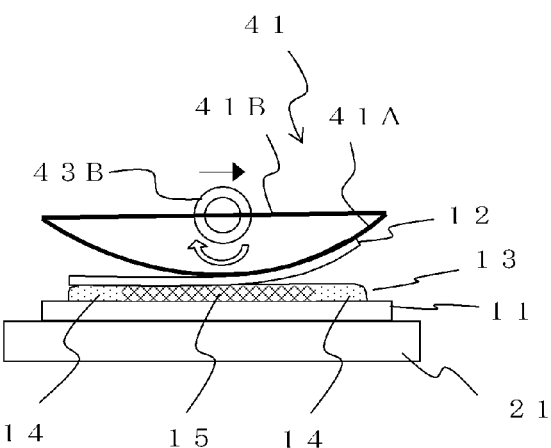
FIG. 11B shows a view following FIG. 11A that illustrates an example in which the holding means holds a second substrate in a curved shape.
Figure 11C:
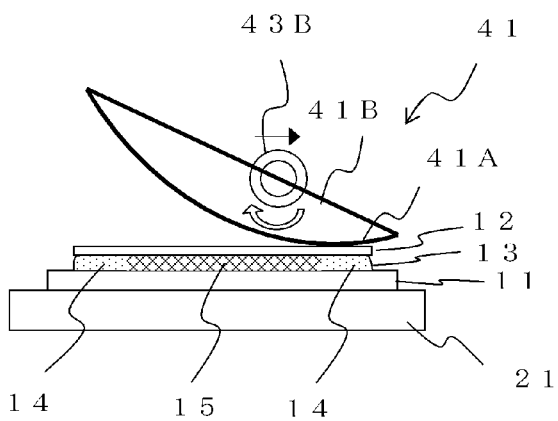
FIG. 11C shows a view following FIG. 11B that illustrates an example in which the holding means holds a second substrate in a curved shape.

FIG. 11A, FIG. 11B and FIG. 11C illustrate an example in which the holding means 41 holds the substrate film 12 in a curved shape. The holding means 41 holds the substrate film 12 in a holding part 41A in the curved shape (convex surface). The holding means 41 has a holding part support plate 41B in an opposite side of the substrate 11 with respect to the holding part 41A. The holding part support plate 41B is rotatably coupled to the rotational shaft 43B, and the opening angle with the substrate 11 changes according to the rotation of the rotational shaft 43B. First, the substrate film 12 is brought into contact with the resin film 13 in a liquid state at one end of the outer peripheral section 14 as the starting point 16 (FIG. 11A). Next, the rotational shaft 43B is rotated and moved to the right side of the drawing, and the substrate film 12 is brought into contact with the liquid resin film 13 (FIG. 11B). Furthermore, the rotational shaft 43B is rotated and moved to the right side of the drawing, and thus the substrate film 12 is brought into contact with the other end of the outer peripheral section 14 of the resin film 13, and the substrate film 12 is bonded to the substrate 11 through the resin film 13 (FIG. 11C).

Accordingly, the boundary line between the contact portion and the noncontact portion moves from the starting point 16 to the opposite end in one direction while the pressing force is applied, and thus the relative misalignment is absent between the substrates, the bonded member that has no or very small distortion (undulation) on the surface of the substrate film 12 is formed, and the flat interface is formed between the substrate film 12 and the resin film 13.

The other configurations and the process flow are the same as those in Embodiment 3, and the same effects can be provided.

Embodiment 5

In Embodiment 5, an example in which a voltage is applied to the holding means 41 in Embodiment 3 is described. In Embodiment 5, a voltage application means 60 is added to the manufacturing apparatus 10A of the bonded member in Embodiment 3 (see FIG. 8). The voltage is applied between the mounting means (table) 21 and the holding means 41. The other configurations are the same as those in Embodiment 3.

Figure 13:
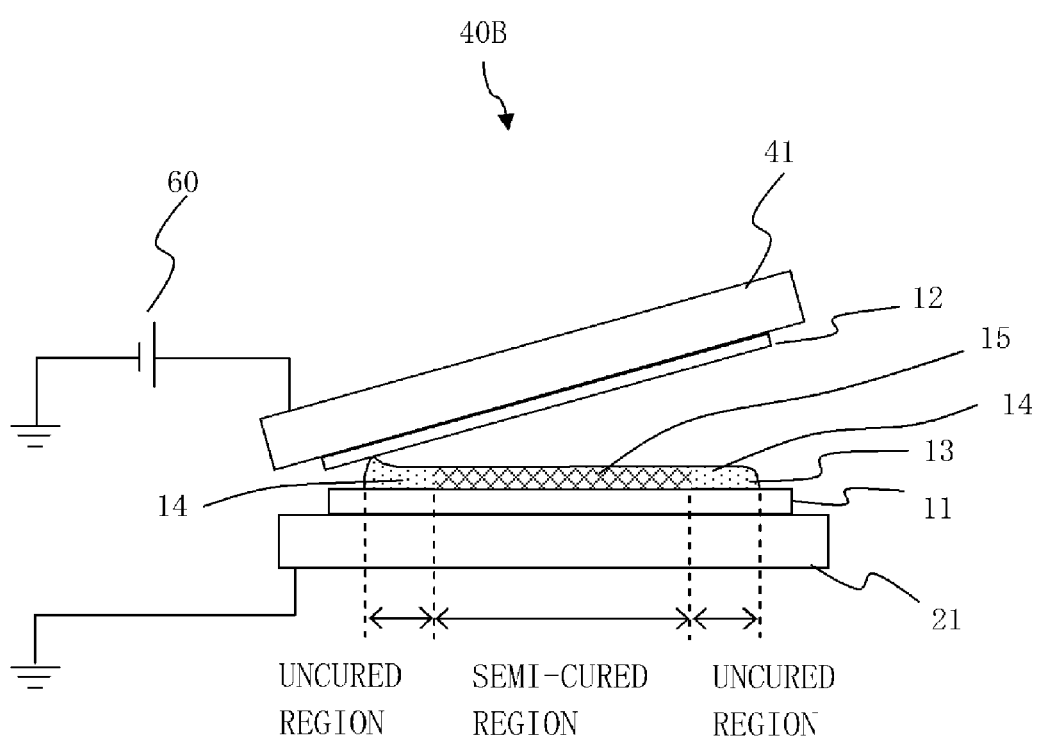
FIG. 13 is a view that illustrates an example in which an electric field is applied between a first substrate and a second substrate.

FIG. 12 shows a configuration example of the manufacturing apparatus 10B of the bonded member in Embodiment 5. In addition, FIG. 13 illustrates an example in which an electric field is applied between the first substrate (substrate) 11 and the second substrate (film) 12. A direct-current power supply 60 is connected to the holding means 41, and the table 21 is connected to ground. When the electric field is formed between the substrate 11 and the substrate film 12, a front end of the resin film 13 on the substrate 11 is attracted to the substrate film 12, and therefore the substrate film 12 can be brought into contact with the resin film 13 with a small contact area. Thus, when the substrate film 12 is brought into contact with the resin film 13, air bubbles are hardly trapped. As an alternative to the direct-current power supply 60, an alternating-current power supply or a pulsing voltage source can be connected.

The other configurations and the process flow are the same as those in Embodiment 3, and the same effects can be provided.

Embodiment 6

In Embodiment 1, the example in which the ultraviolet shielding means is used to maintain the outer peripheral section of the resin film in the uncured state and cure the inner section into the semi-cured state has been described, and in Embodiment 6, as an another example of the light blocking means, an example in which the ultraviolet irradiation means having an ultraviolet irradiation slit integrally constructed with the slit coater is used to maintain the outer peripheral section of the resin film in the uncured state and cure the inner section into the semi-cured state will be described. The ultraviolet irradiation means and the slit coater are integrally constructed, and the construction is different from Embodiment 1.

Figure 14:
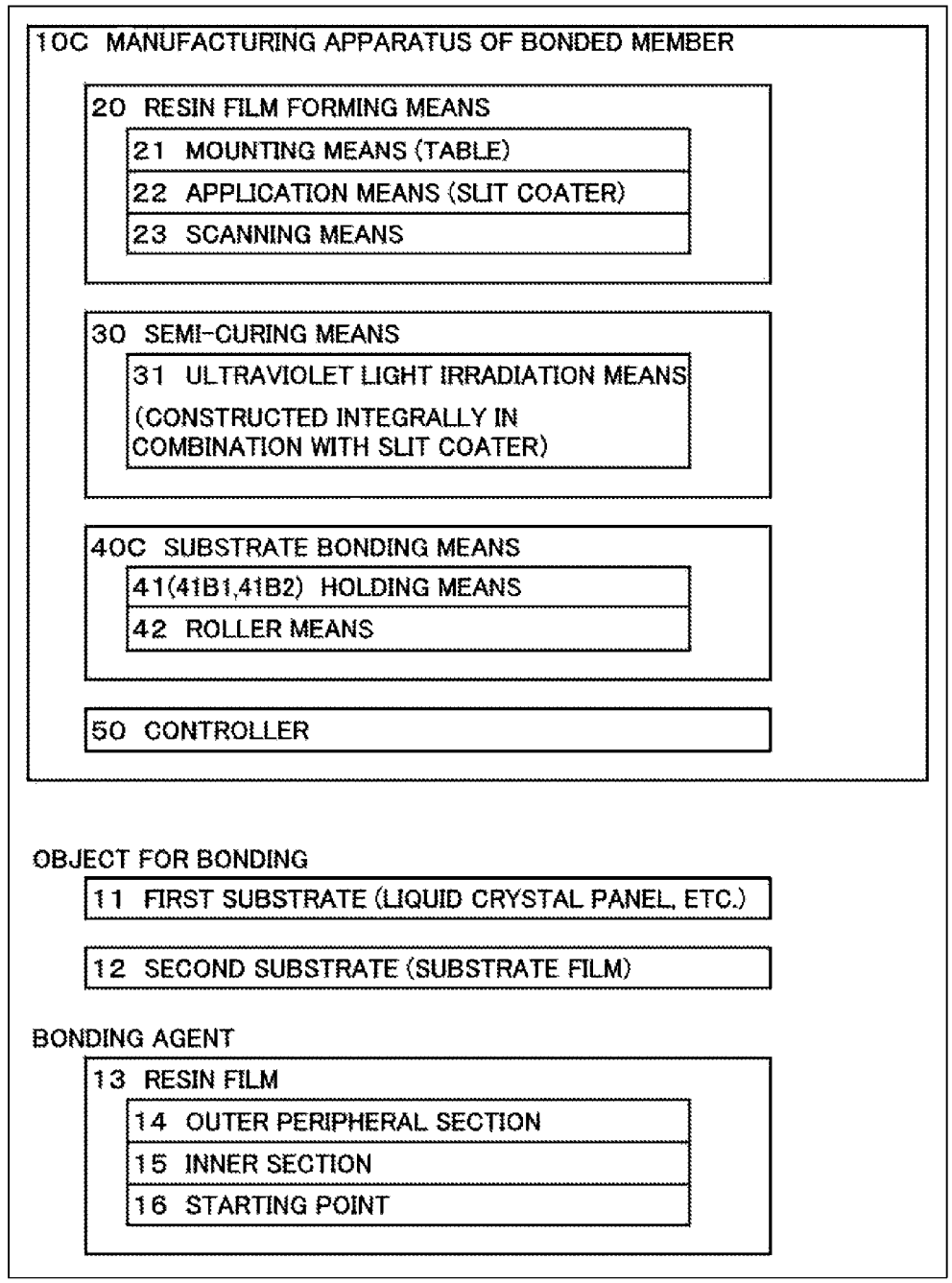
FIG. 14 is a block diagram that illustrates a configuration example of a manufacturing apparatus of a bonded member in Embodiment 6.
Figure 15:
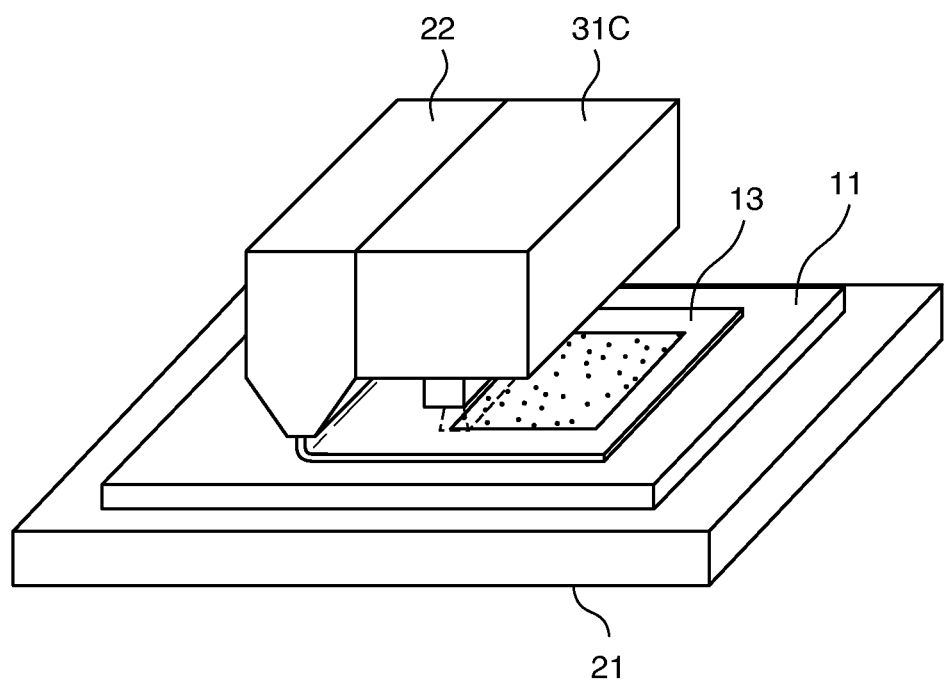
FIG. 15 is a view that illustrates an example in which a slit coater as an application means and an ultraviolet irradiation means are integrally formed in combination.

FIG. 14 shows a configuration example of the manufacturing apparatus 10C of the bonded member in Embodiment 6. In addition, FIG. 15 illustrates an example in which the slit coater as the application means 22 and the ultraviolet irradiation means 31C are integrally formed. The ultraviolet irradiation means 31C having an ultraviolet irradiation slit is provided in parallel with the resin feeding slit of the slit coater as the application means 22. Along with the application of the liquid resin, the ultraviolet light is irradiated to the liquid resin to semi-cure the resin film 13. With respect to the resin feeding slit of the slit coater 22, the length of the ultraviolet irradiation slit between both ends in the longitudinal direction is formed shorter by a specified length than the length of the resin feeding slit in the longitudinal direction. The specified length is generally the width of the outer peripheral section 14 at one end, and the sum at both ends is the double of the width of the outer peripheral section 14 in length. Furthermore, the scanning means 23 scans (moves) the slit coater 22 and the ultraviolet irradiation means 31C that are integrated or combined, in the horizontal plane and in the perpendicular direction to the longitudinal direction of the both slits. By this scanning, on the surface of the first substrate (substrate) 11, when a specified time elapses after the resin film 13 in the liquid state is linearly applied from the resin feeding slit with the slit coater 22, the ultraviolet light starts to be linearly irradiated from the ultraviolet irradiation slit. The specified time is the time obtained from a calculation in which the spacing between the resin feeding slit and the ultraviolet irradiation slit plus the width of the outer peripheral section 14 is divided by the scanning speed.

At this time, the ultraviolet irradiation slit is shorter than the resin feeding slit at both ends in the longitudinal direction, and therefore the ultraviolet light is not irradiated at both ends (to be the outer peripheral sections 14) of the resin film 13 in the longitudinal direction. Thus, the resin film 13 is formed in the uncured state at both ends in the longitudinal direction (in the perpendicular direction to the scanning direction) and in the semi-cured state in the inside (to be the inner section 15) of the both ends. Regarding the direction in parallel with the scanning direction, the ultraviolet irradiation is started and finished when the ultraviolet irradiation slit is positioned at a specified distance from the end of an application area, and thus the area in the uncured state can be formed at the both ends of the resin film 13. The specified distance is typically the width of the outer peripheral section. In other words, the semi-curing of the resin film is conducted through the ultraviolet irradiation to only the inner section 15 and not to the outer peripheral sections 14 at four sides of the applied resin film. In this Embodiment, even though the ultraviolet shielding means 32 is not provided, only the inner section 15 can be semi-cured and the outer peripheral sections 14 is not.

The other configurations and the process flow are the same as those in Embodiment 1, and the same effects can be provided.

Embodiment 7

In Embodiment 7, an example in which the thickness of the first substrate (substrate) 11 is measured in Embodiment 3 before the resin film 13 is formed on the substrate 11 by the slit coater is described.

Figure 17:
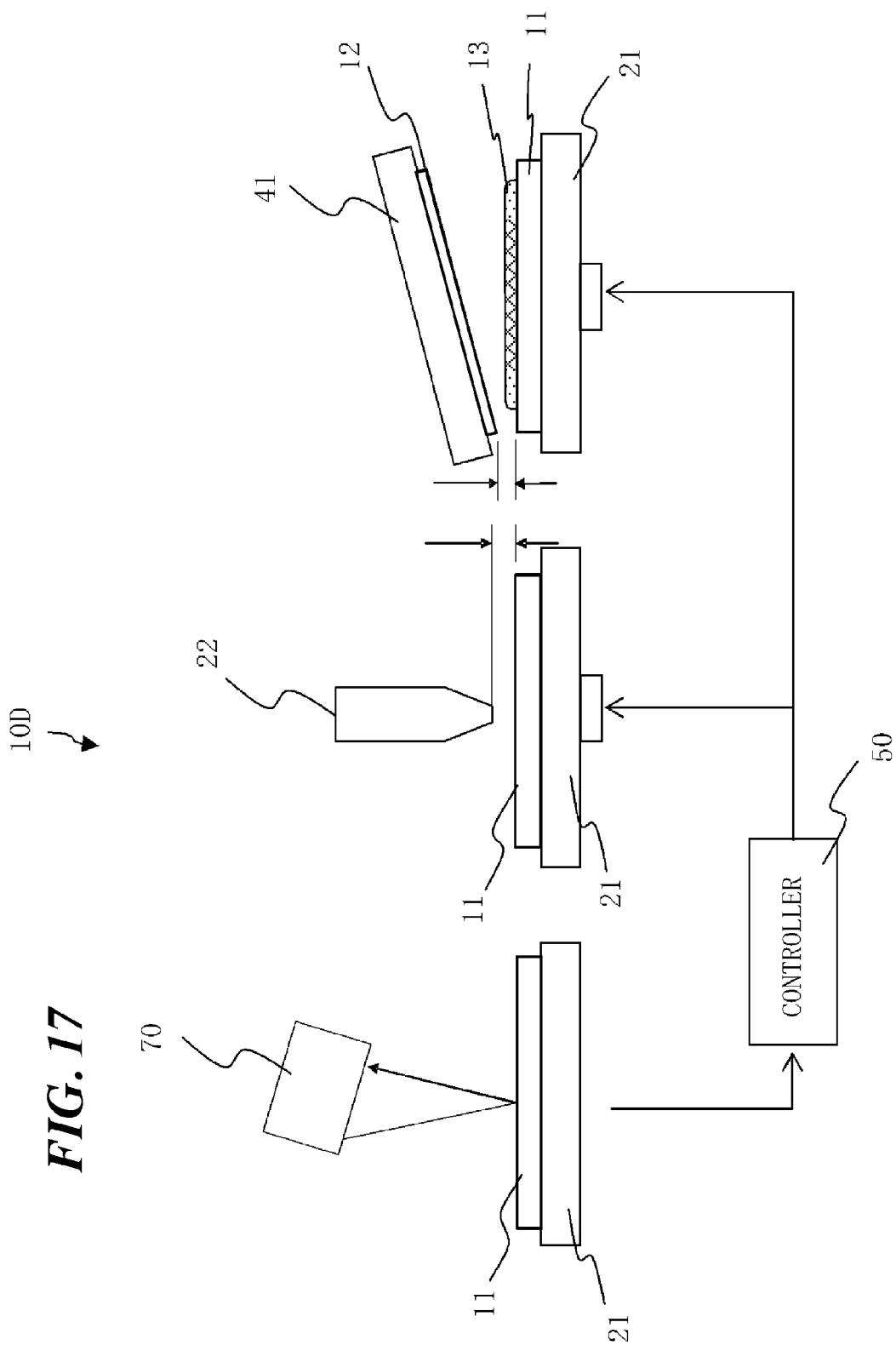
FIG. 17 is a view that illustrates an example of measuring the thickness of the first substrate.
Figure 18:
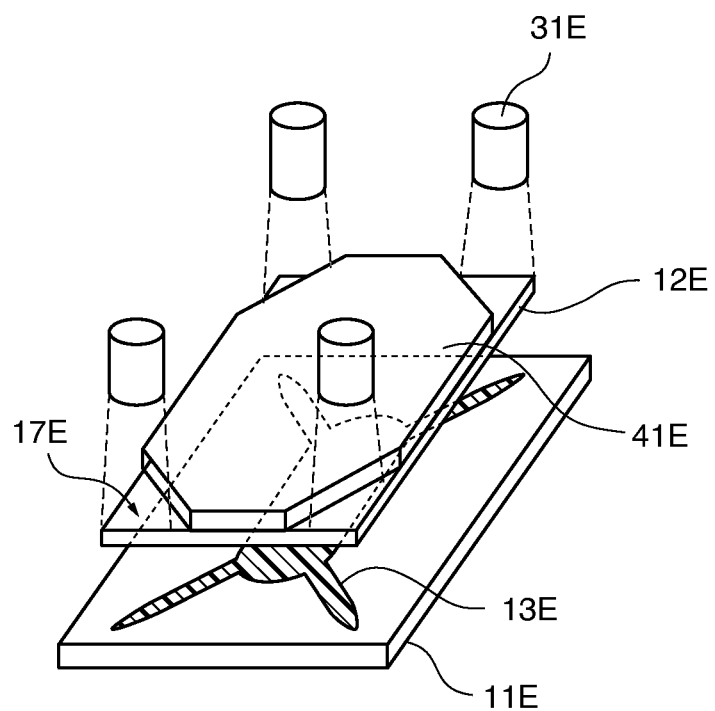
FIG. 18 is a view that schematically shows a conventional bonding method.

FIG. 16 shows a configuration example of the manufacturing apparatus 10D of the bonded member in Embodiment 7. Furthermore, FIG. 17 illustrates an example of measuring the thickness of the substrate 11. The thickness of the substrate 11, that is, the height from the mounting means (table) 21 to the surface of the substrate 11 is measured by a laser displacement gauge as a substrate thickness measuring means 70, and the thickness information of the substrate 11 as the result of the measurement is input to the controller 50. The controller 50 outputs the control signals for controlling the up-and-down movement of the application means 22, the substrate bonding means 40D, and/or the table 21. Accordingly, the height of the resin feeding slit of the slit coater 22 and the height of the holding means 41 of the substrate bonding means 40D with respect to the surface of the substrate 11 are adjusted. In other words, in the application means 22, the slit coater 22 or the table 21 is moved up and down in order to adjust the spacing between the tip of the slit coater 22 as the application means and the substrate. The spacing between the tip of the slit coater 22 and the substrate 11 is adjusted in accordance with the thickness of the resin film 13 to be applied. Furthermore, in the substrate bonding means 40D, the holding means 41 for holding the substrate film 12 or the table 21 for mounting the substrate 11 is moved up and down in order to adjust the spacing between the substrate 11 and the substrate film 12. In addition, the spacing between the substrate 11 and the substrate film 12, that is, the spacing between the holding means 41 and the table 21 is adjusted in accordance with the thickness of the resin film 13.

In the substrate bonding means 40D, the thickness of the substrate film 12 is also measured in addition to the substrate 11, the spacing between the substrate 11 and the substrate film 12 is adjusted, based on the thickness data of the substrate 11 and the substrate film 12, and therefore more appropriate adjustment of the spacing can be achieved. The thickness of the second substrate may also be measured on the table 21, for example. Here, it is understood that, when the substrate film 12 and the substrate 11 are bonded by using the roller means 42 as described in Embodiment 1 and Embodiment 2, the thickness information of the substrate film 12 and the substrate 11 measured by the thickness measuring means 70 can also be utilized.

The other configurations and the process flow are the same as those in Embodiment 1 and Embodiment 3, and the same effects can be provided.

Up to this point, although the present embodiments have been described, it is obvious that the present invention is not limited to the embodiments described above, but various modifications can be made without departing from the spirit of the present invention.

For example, in the above Embodiments, the example in which the second substrate is the film-like thin substrate has been described, but the thin substrate is not limited to the film and may be a plate-like substrate. The second substrate is not limited to the thin substrate, and the present invention is applicable to a thick substrate. The first substrate and the second substrate may be any substrates, and both substrates may be exchanged and applied. The example using the slit coater as the application means 22 of the resin in the liquid state has been described, but the application may be conducted while a single nozzle is scanned in two directions within the mounting surface of the mounting means, and the scanning range described above may be decreased by using multi-nozzles. As the ultraviolet irradiation means 31, the example in which the entire first substrate 11 is irradiate and the example in which the ultraviolet irradiation slit is scanned have been described, but the ultraviolet lamp with a circular spot may be scanned in two directions within the mounting surface to irradiate.

In a baking furnace in which a line ultraviolet irradiation means is disposed on a ceiling, a tray which the first substrate 11 in which the resin film 13 is applied and the shielding means 32 are mounted on may be placed on a belt conveyer and pass. In Embodiment 3, the example in which the substrate bonding means 40 rotates the holding means 41 has been described in combination with the example in which the application means 22 is an independent slit coater and the ultraviolet irradiation means 31 irradiates the substrate 11 in combination with the shielding means 32, but Embodiment 5 in which the slit coater and the ultraviolet irradiation means are integrally formed may be combined. In Embodiment 5, the example in which the voltages are applied between the substrates may similarly be combined with Embodiment 6 in which the slit coater and the ultraviolet irradiation means are integrally formed. In Embodiment 7, the example in which the thickness of the first substrate 11 is measured in advance has been described in combination with the example in which the substrate bonding means 40 rotates the holding means 41, but the example in which the substrate bonding means 40 uses the roller means 42 may be combined to use in the adjustment of the height of the roller along with the height of the resin feeding slit. Other things such as the viscosity of the liquid resin, time and intensity of the ultraviolet irradiation, pressing force of the roller at the bonding can be selected appropriately.

INDUSTRIAL APPLICABILITY

The present invention is used to the production of the bonded member.

DESCRIPTION OF REFERENCE NUMERALS AND SYMBOLS

10, 10A-10D manufacturing apparatus of bonded member
11, 11E first substrate (liquid crystal panel)
12, 12E second substrate (substrate film)
13, 13E resin film (bonding agent)
14 outer peripheral section
15 inner section
16 starting point
17E cutout section
20 resin film forming means
21 mounting means (table)
22 application means (slit coater)
23 scanning means
30 semi-curing means
31, 31E ultraviolet irradiation means
32 light blocking means (shielding means)
40, 40A-40D substrate bonding means
41, 41B1, 41B2, 41E holding means
41A holding part
41B holding part support plate
42 roller means
43 rotating means
43A hinge part
43B rotational shaft
43C driving part
44 rotational shaft position adjusting means
50 controller
51 application means driving part
60 direct-current power supply
70 substrate thickness measuring means (laser displacement gauge)

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A bonded member manufacturing apparatus for bonding a first substrate and a second substrate together comprising:
   a resin film forming means for forming a liquid state resin film on the first substrate;
   a semi-curing means for maintaining an outer peripheral section of the resin film formed with the resin film forming means in an uncured state and curing an inner section surrounded with the outer peripheral section in a semi-cured state with ultraviolet irradiation;
   a substrate bonding means for bonding the first substrate and the second substrate together by bringing the second substrate into contact with the resin film having the outer peripheral section in the uncured state and the inner section in the semi-cured state;
   a full-curing means for curing fully the resin film interposed between the first substrate and the second substrate and used for bonding the first substrate and the second substrate with ultraviolet irradiation; and
   a controller for controlling the entire bonded member manufacturing apparatus and each component thereof and for providing the functions of the bonded member manufacturing apparatus;
   wherein the semi-cured state means the state where flowability is lost, adhesiveness remains, and the modulus of elasticity is lower than that in the fully cured state, all of the inner section is semi-cured including a surface thereof,
   the inner section comes into the semi-cured state with maintaining flatness of the surface and the uniformity of the film thickness when the inner section is cured from a liquid state;
   the resin film forming means has a slit coater that feeds the resin film in the liquid state from a resin feeding slit which is parallel to the surface of the first substrate, the slit coater being configured to be scanned to a direction parallel to the surface of the first substrate and perpendicular to the resin feeding slit;
   the substrate bonding means has a mounting means for mounting the first substrate horizontally held thereon with a bonding surface of the first substrate directed upward, a holding means for holding the second substrate, means for adjusting a relative position of a rotational shaft or a shaft of a roller means with respect to the mounting means, means for applying pressing force and means for moving a boundary line between a contact portion and a noncontact portion in one direction from a starting point which is one end of the outer peripheral section to an opposite end of the outer peripheral section while applying a pressing force with the means for applying pressing force to the second substrate, the contact portion being already contacted and the noncontact portion being not yet contacted in a process of bringing the second substrate into contact with the resin film;
   the controller controls the means for adjusting the relative position and the means for moving the boundary line such that the boundary line moves in the one direction from the starting point to the opposite end while applying the pressing force to the second substrate so that a flat interface is formed between the second substrate and the resin film and no or very small distortion on a surface of the second substrate is formed;
   the semi-curing means has an ultraviolet irradiation means for irradiating ultraviolet light to cure the resin film, and a light blocking means for blocking the ultraviolet light of the ultraviolet irradiation means from irradiating the outer peripheral section;
   wherein the light blocking means is a shielding means for shielding the outer peripheral section in a specified width from an outer periphery of the resin film from irradiation of the ultraviolet light but does not shield the inner section surrounded with the outer peripheral section.

2. The manufacturing apparatus according to claim 1, wherein the substrate bonding means has a rotating means for rotating the holding means, the rotating means being coupled with the holding means; and wherein the controller controls spacing between the mounting means and the holding means and controls the rotating means to allow the second substrate held with the holding means to be brought into contact with the resin film.

3. The manufacturing apparatus according to claim 2, further comprising:
   a substrate thickness measuring means for measuring a thickness of at least one of the first substrate and the second substrate;
   wherein the substrate bonding means is for adjusting the spacing based on thickness data of at least one of the first substrate and the second substrate obtained by the substrate thickness measuring means.

4. The bonded member manufacturing apparatus according to claim 1, wherein the specified width from an outer periphery corresponds to or is slightly larger than a width of a bulged portion on the resin film when the resin film is in the liquid state.

5. The bonded member manufacturing apparatus according to claim 4,
wherein the light blocking means is frame-like blocking plate which is arranged in close range just on the resin film formed on the first substrate.

6. The manufacturing apparatus according to claim 1,
wherein the second substrate is a transparent polymer film; and
the substrate bonding means has a roller means for rolling on the second substrate from one end side to another end side of the outer peripheral section while pressing the second substrate toward the first substrate, and thereby bonding the second substrate to the first substrate.

7. The manufacturing apparatus according to claim 1,
wherein the substrate bonding means has a rotating means for rotating the holding means, the rotating means being coupled with the holding means; and
the holding means having a convex and curved surface for holding the second substrate in a curved shape, the substrate bonding means being constituted so that the holding means is rotated by the rotating means, thereby the second substrate is bonded to the first substrate.

8. The bonded member manufacturing apparatus according to claim 1,
wherein the means for moving the boundary line is a roller means that has a shaft and rotates around the shaft while pressing the second substrate toward the first substrate and rolls from one end side to the other end side of the outer peripheral section, and bonds the second substrate to the first substrate, and
the controller controls a position adjusting means for controlling a vertical position of the mounting means as the means for adjusting a relative position of a shaft of the roller means with respect to the mounting means to a perpendicular direction and controls the roller means for adjusting the motion of the roller means from one end side to the other end side so that the thickness of the resin film becomes the same in the outer peripheral section and the inner section.

9. The bonded member manufacturing apparatus according to claim 1,
wherein the means for moving the boundary line is a rotating means that is coupled to the mounting means to rotate the holding means about a rotational shaft in the rotating means, and
the controller controls a rotational shaft position adjusting means as the means for adjusting the relative position of the rotational shaft with respect to the mounting means to adjust the relative position of the rotational shaft with respect to the mounting means to a perpendicular direction, and controls the rotational shaft position adjusting means for adjusting a rotation angle of the holding means so that the thickness of the resin film becomes the same in the outer peripheral section and the inner section.

10. The bonded member manufacturing apparatus according to claim 1,
wherein the first substrate is a rectangular flat plate.

11. A bonded member manufacturing apparatus for bonding a first substrate and a second substrate together comprising:
a resin film forming means for forming a liquid state resin film on the first substrate;
a semi-curing means for maintaining an outer peripheral section of the resin film formed with the resin film forming means in an uncured state and curing an inner section surrounded with the outer peripheral section in a semi-cured state;
a substrate bonding means for bonding the first substrate and the second substrate together by bringing the second substrate into contact with the resin film having the outer peripheral section in the uncured state and the inner section in the semi-cured state, such that one end of the outer peripheral section is determined as a starting point of the contact so that a boundary line between a contact portion and a noncontact portion moves in one direction from the starting point to an opposite end of the outer peripheral section while applying pressing force to the second substrate, the contact portion being already contacted and the noncontact portion being not yet contacted in a process of bringing the second substrate into contact with the resin film;
wherein the semi-curing means has an ultraviolet irradiation means for irradiating ultraviolet light to cure the resin film, and
a light blocking means for blocking the ultraviolet light by the ultraviolet irradiation means to be irradiated to the outer peripheral section,
the resin film forming means has a slit coater to feed a resin in the liquid state from a resin feeding slit and to apply the liquid state resin film on the first substrate, the resin feeding slit being disposed in parallel with a surface of the first substrate, the slit coater being movable perpendicularly to the resin feeding slit and movable in parallel with the surface of the first substrate,
the semi-curing means has the ultraviolet irradiation means for irradiating the ultraviolet light to the liquid state resin film, and the ultraviolet irradiation means has an ultraviolet irradiation slit disposed in a parallel direction with the resin feeding slit, the ultraviolet irradiation means being constructed in combination with the slit coater, the ultraviolet irradiation slit being formed shorter by a specified length in a longitudinal direction between both ends than the resin feeding slit.

* * * * *